(12) United States Patent
Pazhoor

(10) Patent No.: US 8,006,986 B1
(45) Date of Patent: Aug. 30, 2011

(54) MULTI-STATION VOTING BOOTH WITH STORAGE/UTILITY CART

(75) Inventor: Mohamed Pazhoor, West Palm Beach, FL (US)

(73) Assignee: Naztec International Group, LLC, West Palm Beach, FL (US)

( * ) Notice: Subject to any disclaimer, the term of this patent is extended or adjusted under 35 U.S.C. 154(b) by 0 days.

(21) Appl. No.: 12/730,342

(22) Filed: Mar. 24, 2010

(51) Int. Cl.
*B62B 3/0031* (2006.01)

(52) U.S. Cl. ............... 280/47.34; 280/47.35; 280/79.2; 280/79.11; 312/195; 312/196; 312/122; 312/294

(58) Field of Classification Search ............... 280/47.34, 280/47.35, 47.39, 79.11, 79.2; 312/195, 312/196, 122, 294, 317.1, 321.5, 334.21; 235/57, 386
See application file for complete search history.

(56) References Cited

U.S. PATENT DOCUMENTS

| | | | | |
|---|---|---|---|---|
| 2,054,102 A * | 9/1936 | Shoup et al. | ............... | 235/55 R |
| 2,354,743 A * | 8/1944 | Douglas et al. | ............... | 312/6 |
| 2,778,704 A * | 1/1957 | Joachim | ............... | 312/309 |
| 3,178,107 A * | 4/1965 | Fagan | ............... | 235/56 |
| 3,333,766 A * | 8/1967 | Crossland et al. | ............... | 235/50 A |
| 3,550,540 A * | 12/1970 | Harris et al. | ............... | 108/23 |
| 3,652,012 A * | 3/1972 | Harris et al. | ............... | 235/50 R |
| 4,253,715 A * | 3/1981 | Greiner | ............... | 312/21 |
| 4,377,367 A * | 3/1983 | Smith | ............... | 414/545 |
| 4,445,731 A * | 5/1984 | Ahmann | ............... | 312/258 |
| 4,484,787 A * | 11/1984 | Stephens | ............... | 312/239 |
| 4,488,034 A * | 12/1984 | Stephens et al. | ............... | 235/50 A |
| 4,569,564 A * | 2/1986 | Ahmann | ............... | 312/259 |
| 4,660,904 A * | 4/1987 | Stephens | ............... | 312/140.2 |
| 4,712,757 A | 12/1987 | Ahmann | | |
| 5,072,999 A * | 12/1991 | Trotta et al. | ............... | 312/249.8 |
| 5,190,302 A * | 3/1993 | Trotta | ............... | 280/35 |
| 5,275,365 A * | 1/1994 | Gerbel et al. | ............... | 248/129 |
| 5,348,324 A * | 9/1994 | Trotta | ............... | 280/35 |
| 5,666,765 A * | 9/1997 | Sarner et al. | ............... | 52/36.1 |
| 6,053,588 A * | 4/2000 | Biggel et al. | ............... | 312/249.8 |
| 6,129,366 A * | 10/2000 | Dettmann et al. | ............... | 280/47.35 |
| 6,206,495 B1 * | 3/2001 | Peterson | ............... | 312/283 |
| 6,601,861 B1 * | 8/2003 | Dettmann et al. | ............... | 280/47.35 |
| 6,634,668 B2 * | 10/2003 | Urffer et al. | ............... | 280/651 |
| 6,711,980 B2 * | 3/2004 | Kropf | ............... | 89/36.09 |
| 6,926,155 B2 * | 8/2005 | Vogel | ............... | 209/554 |
| 7,044,569 B1 * | 5/2006 | Relyea et al. | ............... | 312/249.11 |
| 7,398,914 B1 * | 7/2008 | Baum | ............... | 232/2 |
| 7,552,931 B2 * | 6/2009 | Liao | ............... | 280/47.34 |
| 7,654,457 B2 * | 2/2010 | Wilson et al. | ............... | 235/386 |
| 7,895,954 B2 * | 3/2011 | Abel et al. | ............... | 108/91 |
| 2002/0092443 A1 * | 7/2002 | Grant | ............... | 108/60 |
| 2002/0106620 A1 * | 8/2002 | Barnum | ............... | 434/306 |
| 2004/0056093 A1 * | 3/2004 | McClure et al. | ............... | 235/386 |

(Continued)

*Primary Examiner* — J. Allen Shriver, II
*Assistant Examiner* — James Triggs
(74) *Attorney, Agent, or Firm* — McHale & Slavin, P.A.

(57) ABSTRACT

A portable voting booth having multiple voting stations combined with a single utility/storage cart. The cart includes portable voting booth stations that can be deployed from the cart with privacy shields that are formed integral and can be erected instantly for privacy. Privacy booths are placed at various levels to accommodate individuals of various heights, including wheelchair bound individuals. Beneath the retractable voting stations is an area for storage of voting materials, allowing the materials to be assembled in a remote location and sealed within the utility cart for storage. The cart then can be moved to the particular locations for the voting procedure. At the voting location, the seal can be broken and the ballots accessed. Upon completion of the voting process the cart can be resealed with the cast ballots.

14 Claims, 51 Drawing Sheets

U.S. PATENT DOCUMENTS

2006/0055135 A1* 3/2006 Tracewell et al. ......... 280/47.35
2008/0116270 A1* 5/2008 Wilson et al. ................ 235/386
2009/0166992 A1* 7/2009 Abel et al. ................ 280/47.35

* cited by examiner

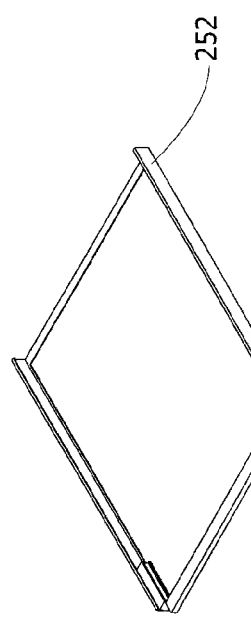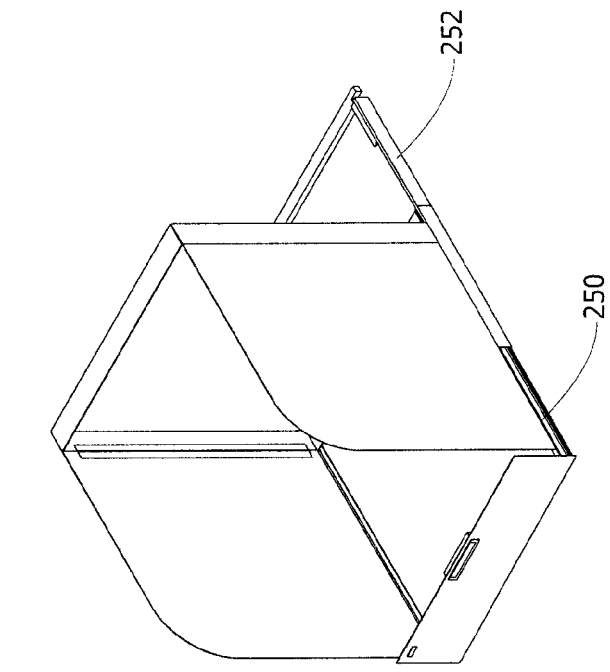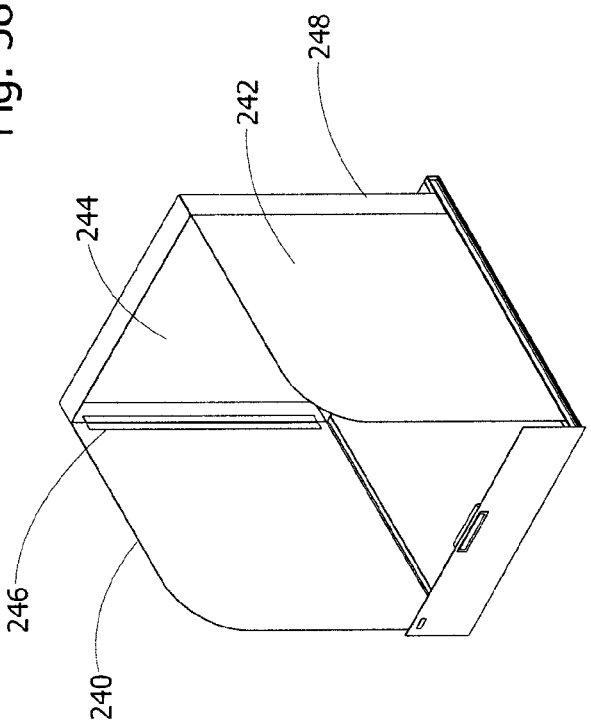

MULTI-STATION VOTING BOOTH WITH STORAGE/UTILITY CART

FIELD OF THE INVENTION

This invention relates to the field of portable voting booths, and in particular to multi-station portable voting booths including a storage cart.

BACKGROUND OF THE INVENTION

Voting booths provide an area of privacy for those exercising the right to vote. Whether the vote is for electing an individual to a position of leadership, or whether to tax cigarettes, the right to vote is a most private matter. For this reason, voting booths of most every configuration can be found; all with a purpose of providing an area of privacy for the individual exercising their freedom to vote. For instance, stand alone units are well known wherein curtains are hung around the individual for privacy. More elaborate booths might have computer terminals built into the stands.

Most every voting booth is portable as they are used only temporarily. The voting process is performed on a predefined date, and depending on the type of election, might require assembly once, twice or multiple times per year. Due to the amount of people that are involved in voting, a school or church having a large area is typically employed. For instance, a school cafeteria may be employed wherein portable stands are assembled and made available for the voting public. Without such devices the election process would fail to render the actual beliefs of the voters.

There are numerous types of voting booths, each having a configuration that permits various degrees of privacy. One of the problems with the currently available portable voting booths is their inability to store critical materials necessary for a particular election. This includes items such as the ballots that will be employed by the voting public as well as the ballots after they have been cast. For the integrity of the election process, the ballots must be accounted for both before and after the vote, and the voting booth must maintain a minimum of privacy so that an individual does not feel obligated to vote in any manner that is contrary to their own belief.

Thus, what is needed in the field is a multi-station voting booth that is easily stored, transported, erected, and can be used to secure pre- and post-voting materials.

SUMMARY OF THE INVENTION

The instant invention is a portable voting booth that incorporates multiple voting stations in a single utility/storage cart. In addition, the storage cart is specifically adapted for holding voting materials both before and after the voting process. The cart includes a plurality of portable voting booth stations that can be deployed from the cart with privacy shields that are formed integral with the stations and can be erected instantly for privacy. A rectangular shaped cart may include up to six privacy booths, and the privacy booths can be placed at various levels which not only allows for compactness and the sizing of the cart, but further allows various levels so that the voting station may have levels for handicapped individuals that may be wheelchair bound, as well as additional levels making it convenient for individuals of all heights to utilize the voting booth.

Beneath the retractable voting stations are areas for storage of voting materials, allowing the materials to be assembled in a remote location and sealed within the utility cart for storage. The utility cart can then be moved to the particular locations for the voting procedure. At the voting location, the seal can be broken and the ballots accessed. Upon completion of the voting process, the votes cast may be placed within the cart with provisions to reseal the cart and allow transportation to another location or to the ballot tally area.

Accordingly, it is an objective of the instant invention to provide a utility cart that allows for the deployment of multiple voting stations.

It is a further objective of the instant invention to provide a utility cart that provides individual voting stations having privacy walls that can be assembled without tools and disassembled after use for ease of storage.

It is still another objective of the instant invention to provide a utility cart that includes a storage area in combination with the stored voting stations for placement of pre- and post-voting ballot materials in a securable location.

It is yet another objective of the instant invention to provide a cart that can be easily moved, and upon positioning may be locked in place by locking the wheels in position.

It is yet still another objective of the instant invention to provide a utility cart that provides various heights for the voting stations wherein individuals that are wheelchair bound or that are quite tall may easily access the voting booth area.

It is yet still another objective of the instant invention to provide a utility cart that may be configured to employ one or more voting stations, depending upon the amount of individuals expected or the particular location spatial requirements, as well as provide loading platforms that do not include privacy shields for use with voting mechanisms that have privacy shields associated therewith.

It is yet still another objective of the instant invention to provide a cart that is strong and durable to withstand countless moves across most any type of surface and has impact edges so as to prevent marring of walls or other utility carts.

It is yet still another objective of the instant invention to provide a multifunction voting cart having privacy shields that can be secured in position by the use of snap pins or magnets to eliminate the need for assembly tools or assembly instructions by providing voting stations that are adherently easy to erect through simplicity of design.

It is yet still another objective of the instant invention to provide portable voting stations that may include lighting at the individual stations.

Other objectives and advantages of this invention will become apparent from the following description taken in conjunction with the accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE DRAWINGS

FIG. 58 is view of the rack assembly;

FIG. 59 is a view of the display booth;

FIG. 60 is a view of the display booth and rack assembly;

DETAILED DESCRIPTION OF THE PREFERRED EMBODIMENT

Figure 1:
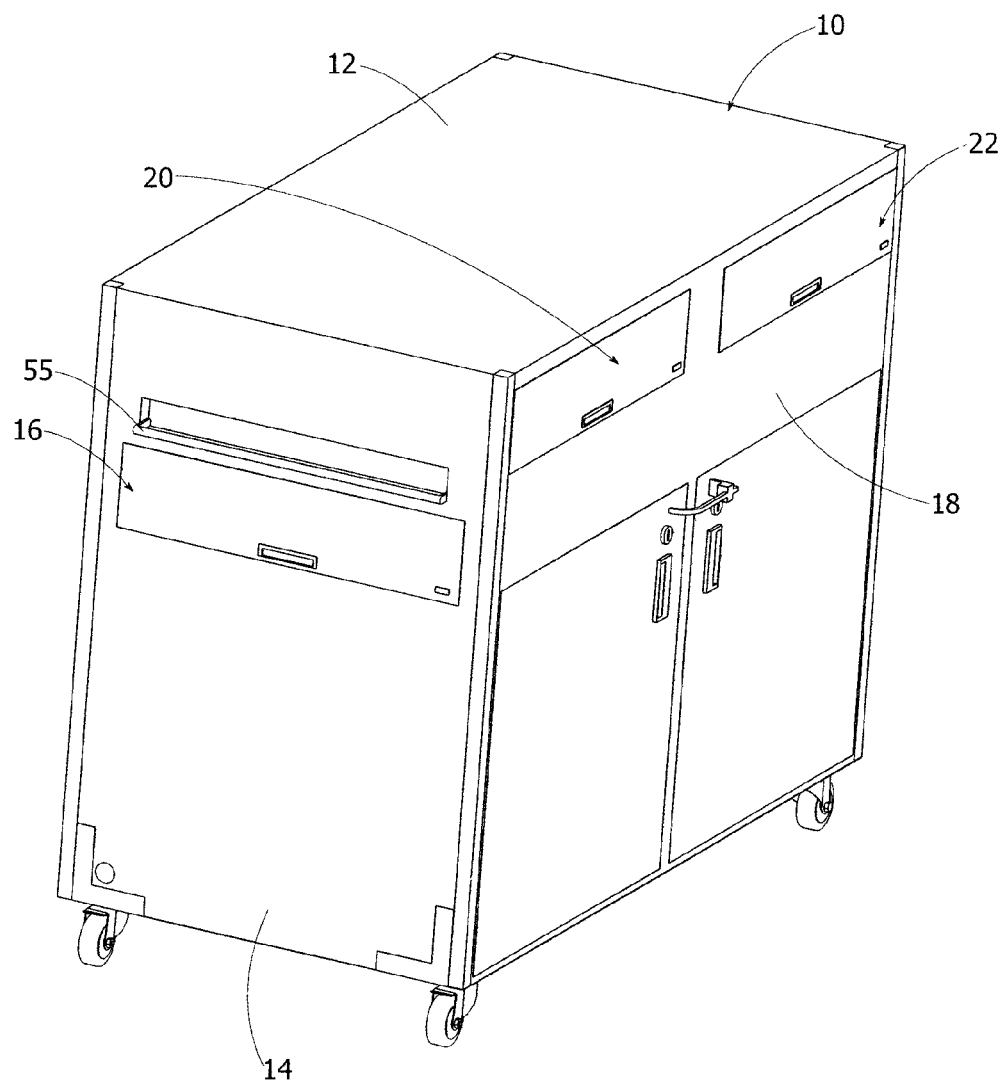
FIG. 1 is a perspective view of the multi-station voting booth with storage/utility cart of the present invention.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Figure 2:
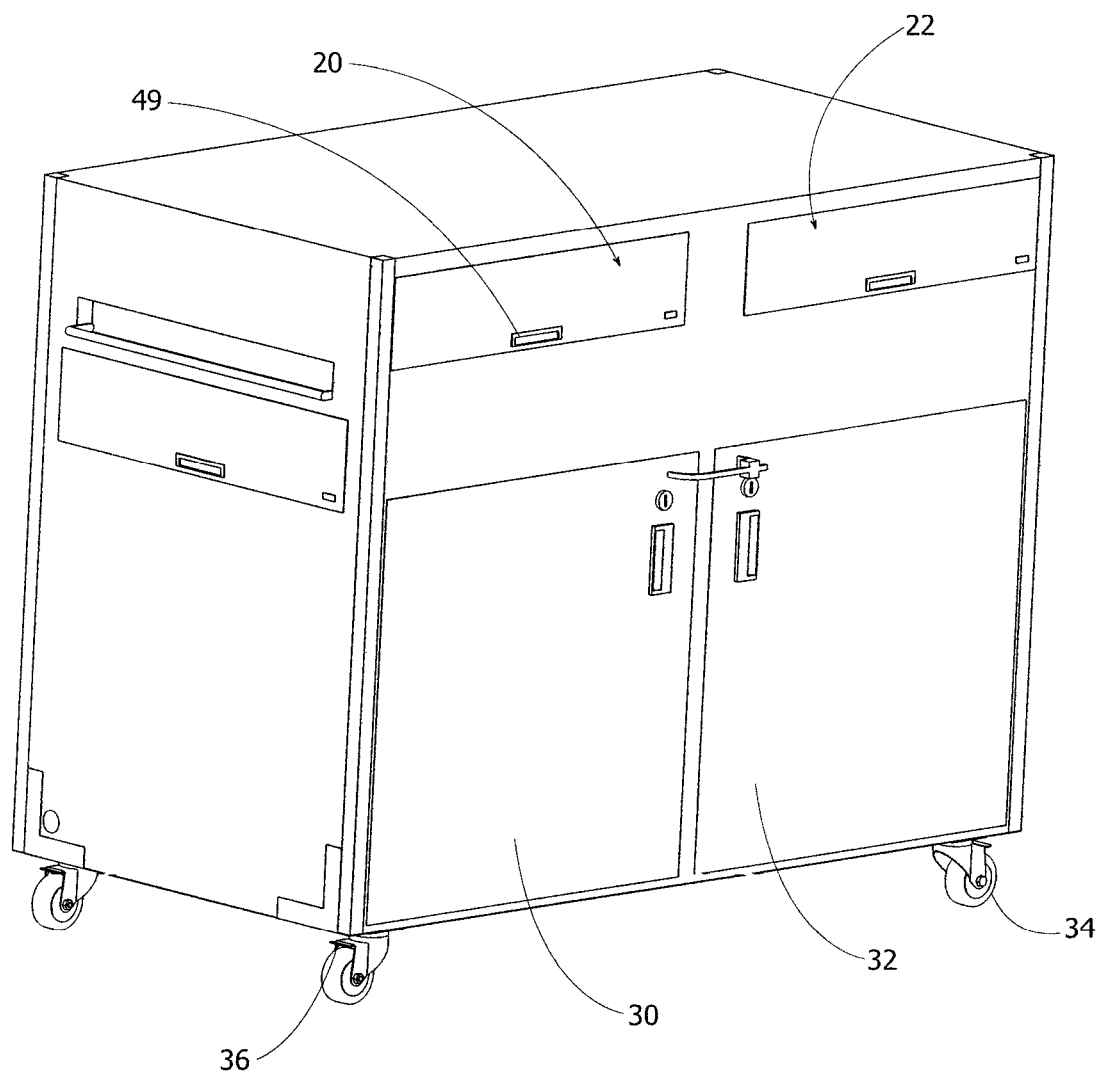
FIG. 2 is a front perspective view thereof.
Figure 3:
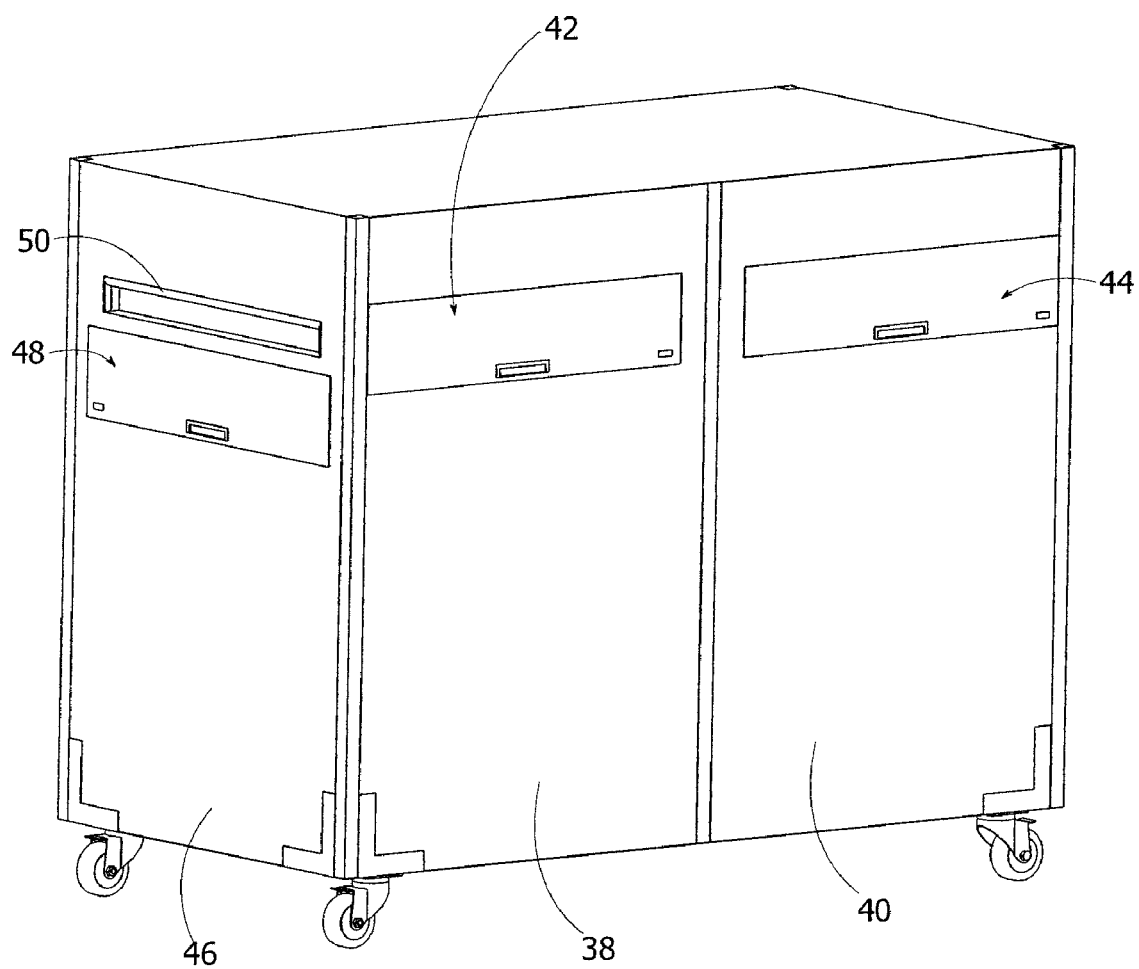
FIG. 3 is a rear perspective view thereof.

Now referring to FIG. 1, set forth is a side perspective view of the multi-station voting booth storage/utility cart (10) having a top surface (12) a first side wall (14) having a handicap accessible voting booth tray (16) and front side (18). A handle (55) is provided to assist in moving of the cart. The front side includes an upper left voting booth tray (20) and an upper right voting booth tray (22). FIG. 2 is a frontal facing perspective view of the multi-station voting booth utility cart. FIG. 2 depicts the upper left voting booth tray (20) and upper right voting booth tray (22), which as will be explained later in this specification, operates as a cover while in a closed position; and when the handle (49) of the voting booth tray is pulled, the tray is withdrawn from the cart and forms a top to the individual voting booth. As part of the storage/utility cart, the frontal area includes a left access door (30) and a right access door (32) for use in concealing various materials as will be described later in this application. Wheels (34), preferably castor, support the cart and allow for transportation of the cart to various locations. A foot operated parking brake (36) works in conjunction with the wheel to maintain the cart in a fixed position. FIG. 3 is a rear perspective view showing a rear wall formed by a left panel wall (38) and right panel wall (40). The left panel wall includes a voting booth tray (42), and the right panel wall includes a voting booth tray (44). The right side wall (46) includes a voting booth tray (48). It should be noted that the voting booth tray (48) is lower than voting booth tray (42). Handle (50), similar to handle (55), is used for ease of moving the storage cart from one location to another.

Figure 4:
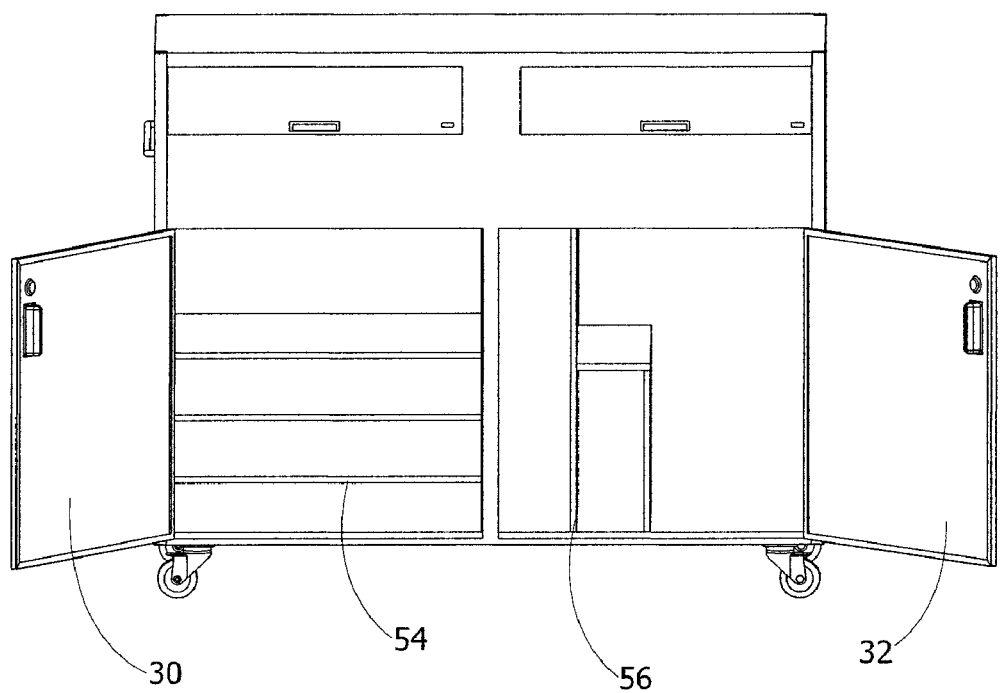
FIG. 4 is a front view thereof.
Figure 5:
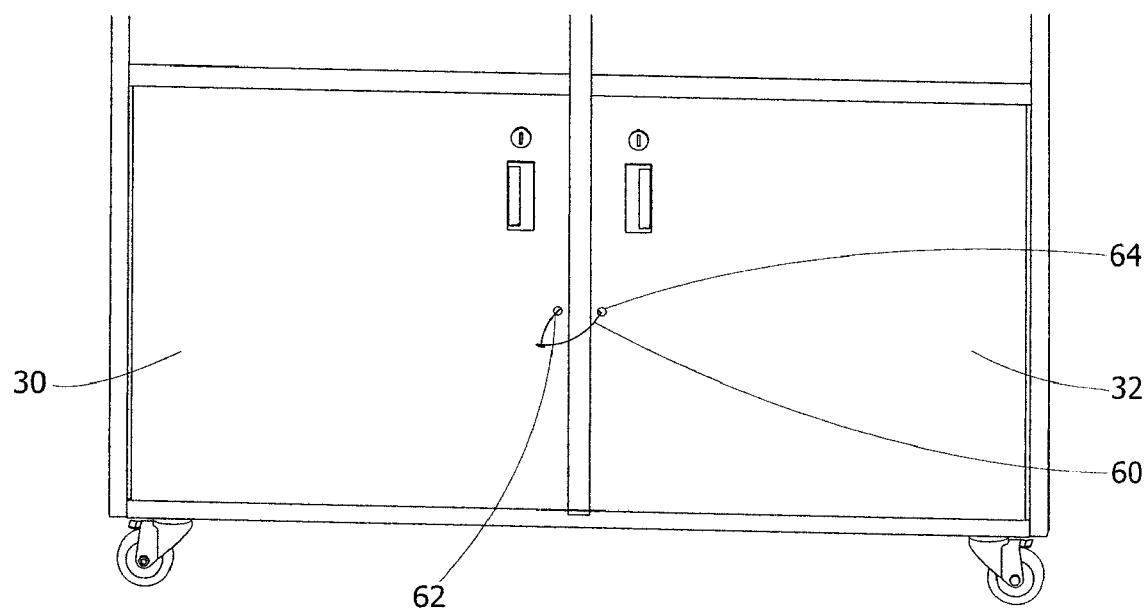
FIG. 5 is an enlarged front view depicting the storage area access doors.

FIG. 4 is a frontal view illustrating the left front access door (30) in an open position together with right front access door (32). Within the storage area are multiple horizontal shelves (54) along one side and multiple vertical dividers (56) shown along the right side of utility cart. The storage area is used for placement of items that should be maintained in an upright position such as a CPU if electronic voting is taking place, or for holding pre- and post-voting ballots. FIG. 5 is a front view of the cart depicting the storage area front panels (30 and 32) and the use of a security device (60) that can be placed on the front doors (30 to 32), through apertures (62 and 64), to assure that the storage area has not been accessed by unauthorized personnel.

Figure 6:
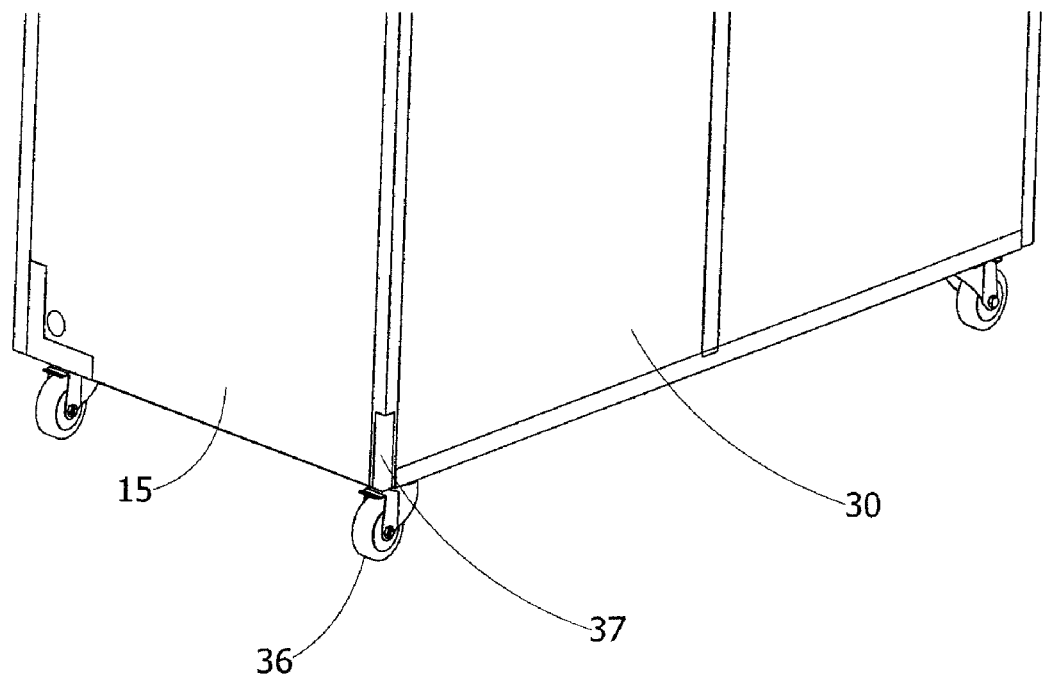
FIG. 6 is a perspective view of a lower corner of the cart.
Figure 7:
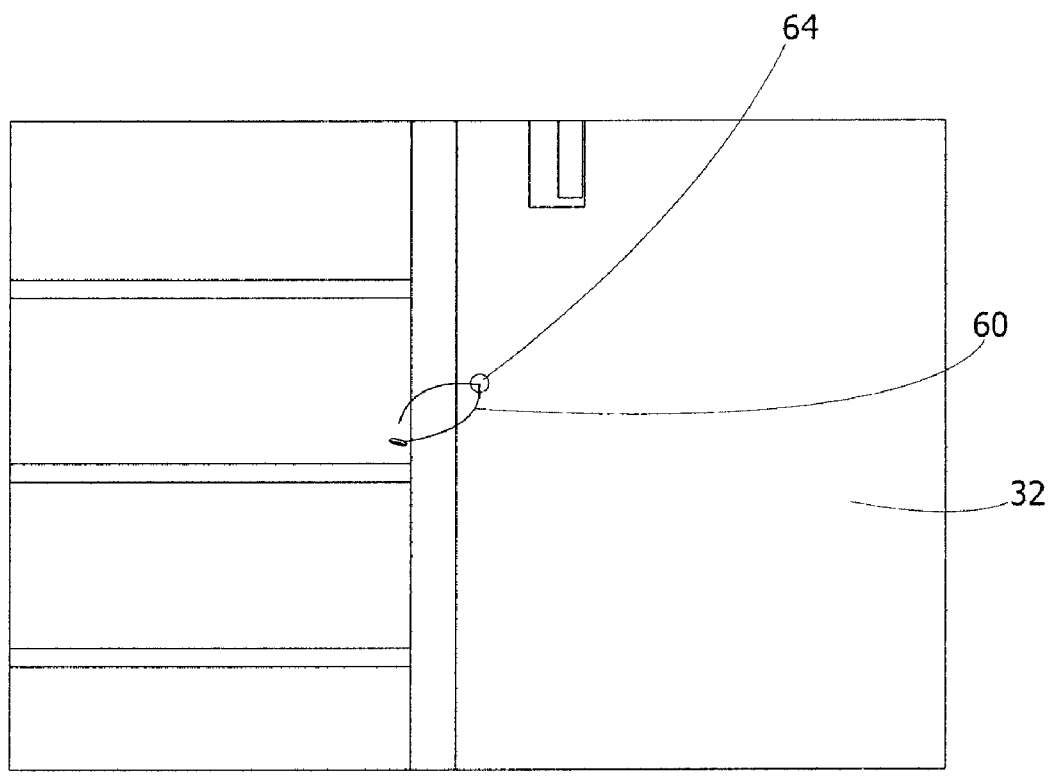
FIG. 7 is an enlargement of a security device.

FIG. 6 is a perspective view of the corner depicting left side wall (15) and front door (30). The castor wheel and brake (36) are engaged when necessary to lock the cart in a stationary position. Reinforcement bracket (37) is placed along each of the corners to provide an engagement point between matching carts to isolate impacts to the location. FIG. 7 is an enlargement of the security device (60) and aperture (64). As previously stated, the security device is placed through the door (32) so as to secure the contents behind the doors when the voting process is in operation. The security device is commonly used in the industry to provide a deterrent for entry, as well as evidence of an unauthorized entry.

Figure 8:
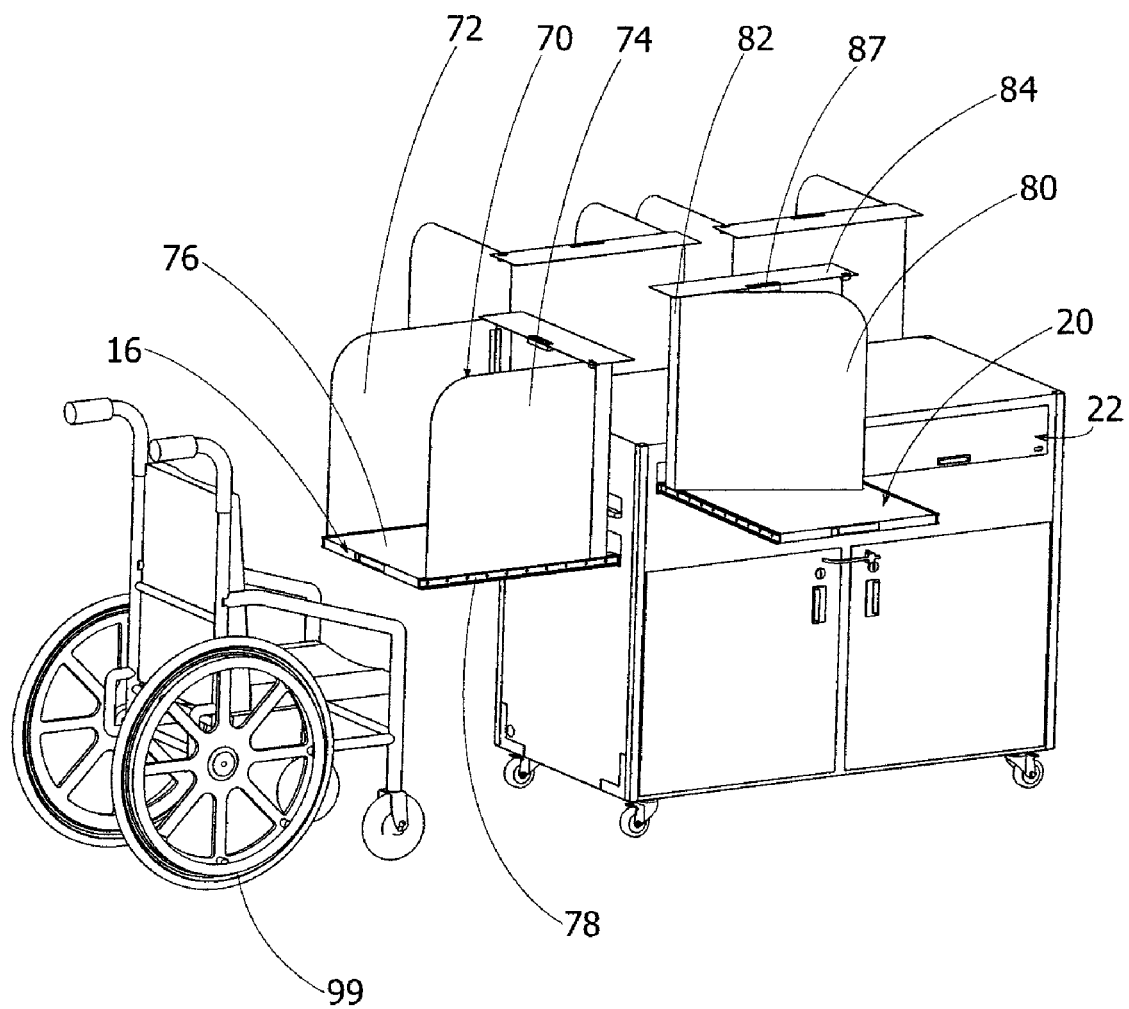
FIG. 8 is a perspective view illustrating the cart in a partially deployed position.

FIG. 8 is a perspective view of the voting booth utility/cart in a partially deployed position wherein voting booth tray (20) is shown in an extending position with the voting booth assembly in an upright but closed position. Voting booth tray (22) is shown in the retracted/storage position. Voting booth tray (16) is shown in the open position with the voting enclosure (70) fully deployed. As will be noted by the placement of the wheelchair (99), tray (70) is placed at a position lower than the standing position of trays (20) and (22). The deployed voting booth (70) includes left side panel (72) and right side panel (74) exposing the surface (76) of the tray for use in concealing the voting documents or machines that are employed by the particular voting district. The voting trays are supported by cabinet guides (78) for extending the tray from a concealed position to a deployed position. Partially deployed tray (20) shows the left cover or panel (80) in a closed position having a piano hinge (82) so as to allow ease of movement from a storage position to an open position. The front cover (84) of the tray (20) further serves as a top cover and allows placement of a light (87) for use in areas wherein the documents require illumination.

Figure 9:
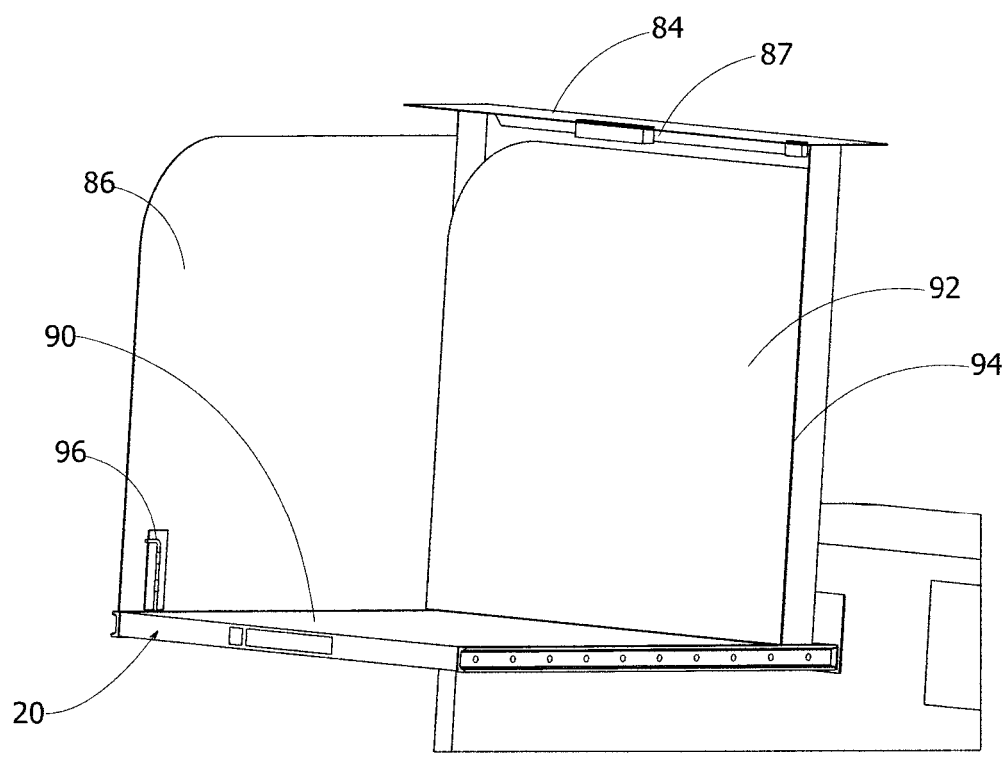
FIG. 9 is a perspective view of a voting booth tray.

FIG. 9 is a perspective view of the voting booth tray (20) having a working surface (90) with the left cover or panel (86) in a deployed position with right cover or panel (92) in a closed position. From this view, the hinge (94) can be clearly seen allowing the right panel (92) to rotate from the closed position to an open position which would be parallel to the left cover or panel (86). As noted, the left side panel includes a locking mechanism (96) for maintaining the left cover or panel (86) in a fixed position. The locking mechanism in this embodiment is a spring loaded pinion that can be raised to allow movement and upon release is biased in a downward position so as to engage an aperture in the surface (90) of the tray (20). Another mechanism that can maintain the panels in position can be the use of magnets, not shown, which are preferable if the surface (90) is made of a material that may lead to marring so as to prevent etching of the surface by improper opening and closing of the side panels. Cover (84) can be seen with light (87) directly beneath the cover for ease of illumination.

Figure 10:
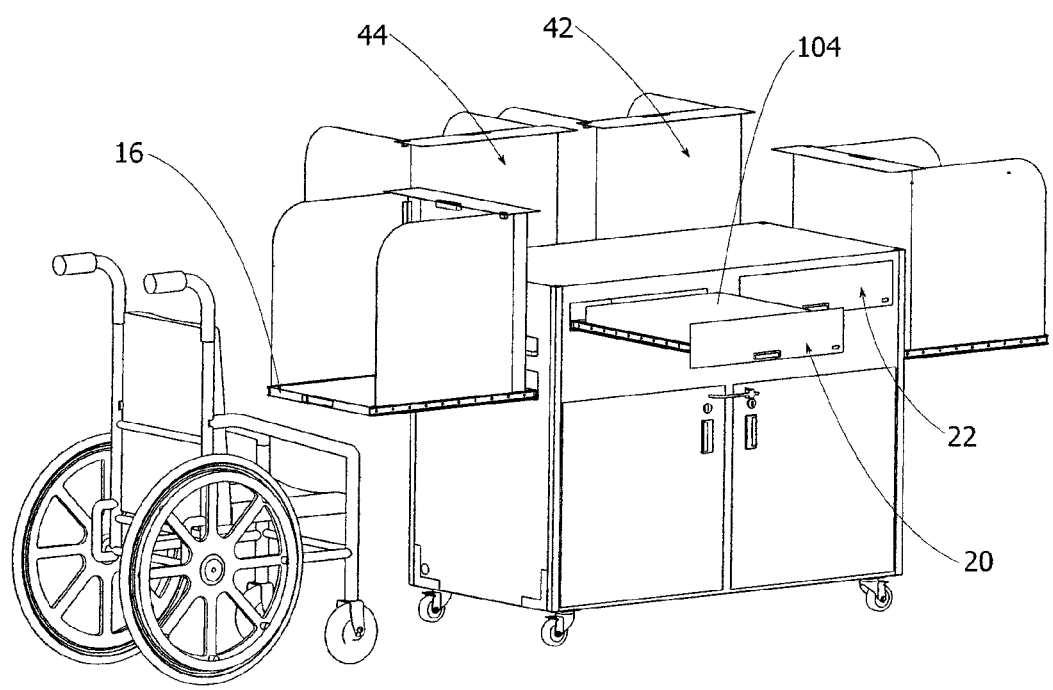
FIG. 10 is a perspective view illustrating partially deployed voting booth.
Figure 11:
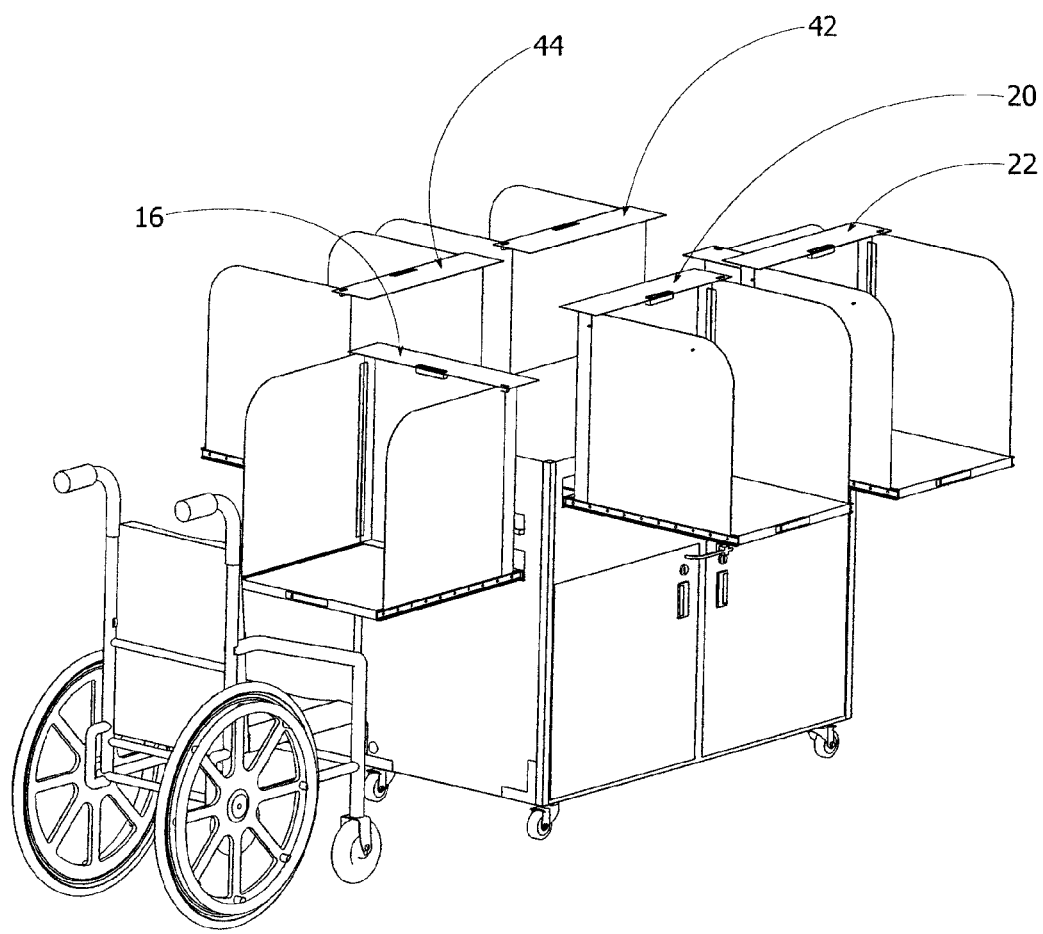
FIG. 11 is a perspective view illustrating fully deployed voting booths.

FIG. 10 further illustrates versatility wherein tray (20) is deployed to allow a working surface (104) on a rear portion of a back panel of tray (20). Tray (16) is shown in deployment at a position for ease of access by a wheelchair bound individual. Trays (42 and 44) are shown in a deployed position allowing voting along the back of the booth. Front right tray (22) is shown in the closed position. In this example, two standup booths are available by opening of tray (42 and 44) and one wheelchair or alternative standup booth is provided by deployment of tray (16). FIG. 11 illustrates all six trays in a deployed position wherein the two ends allow wheelchair accessible locations and the front and rear are available for an individual standing upright. It will be apparent to those skilled in the art that the variation of which trays are open or closed is at the discretion of the precinct wherein the voting booth can be limited to one or handle up to six voters simultaneously.

Figure 13:
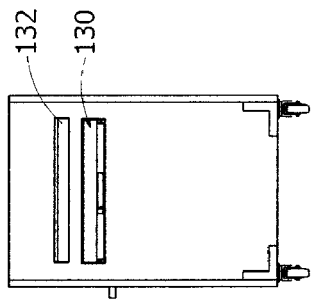
FIG. 13 is a right side view thereof.
Figure 12:
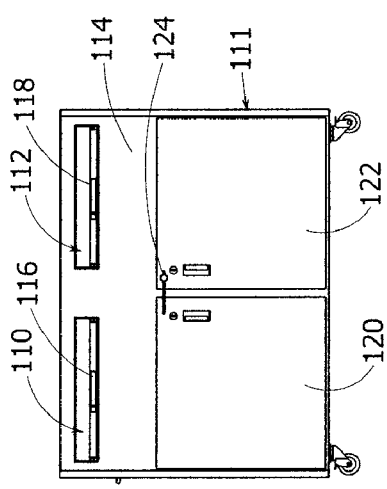
FIG. 12 is a front view of an alternative embodiment with a storage/utility cart.
Figure 14:
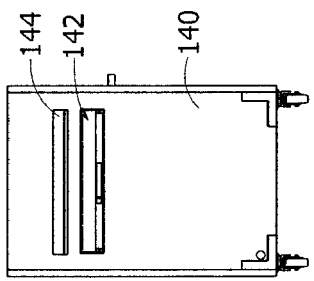
FIG. 14 is a left side view thereof.
Figure 15:
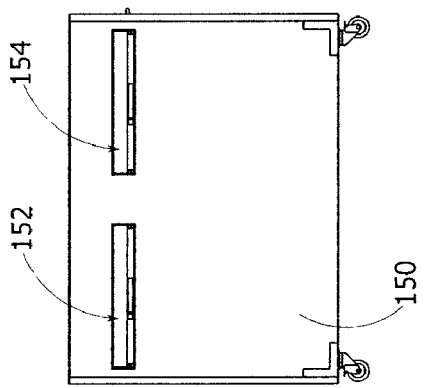
FIG. 15 is a rear view thereof.
Figure 16:
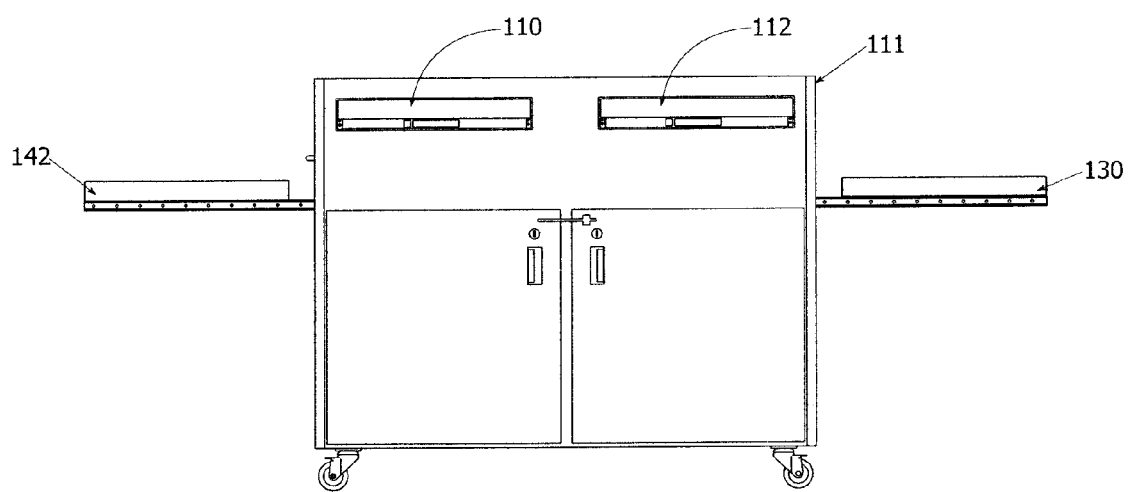
FIG. 16 is a front view thereof with extended trays.

Now referring to FIG. 12, set forth is a front view of a second embodiment of the present invention having a multi-station utility cart. In this embodiment, left tray (110) and right tray (112) shown on the front side (114) are of a design wherein handles (116 and 118) are accessible and remain accessible to the user. As described in the previous embodiment of FIG. 2, a left door (120) and a right door (122) are available for placement of security items within the cart and a security device (124) can be secured to the doors as evidence that the unit has not been tampered with during operation. FIG. 13 is a right side view setting forth a right tray (130) with a handle (132) for movement of the cart as necessary. The mirror image of the right side is shown with the left side. FIG. 14 having side panel (140) with left tray (142) and handle (144) for movement of the cart. FIG. 15 depicts a rear view of the cart. Rear panel (150) with a left tray (152) and right tray (154) available for use as needed. FIG. 16 depicts the front view of the cart (111) with the left side tray (142) and right side tray (130) shown in the deployed position. For proper wheelchair access, the trays (130 and 142) are placed 33 inches (H) above the floor allowing ease of movement for a standard wheelchair with the clearance beneath the trays.

Figure 17:
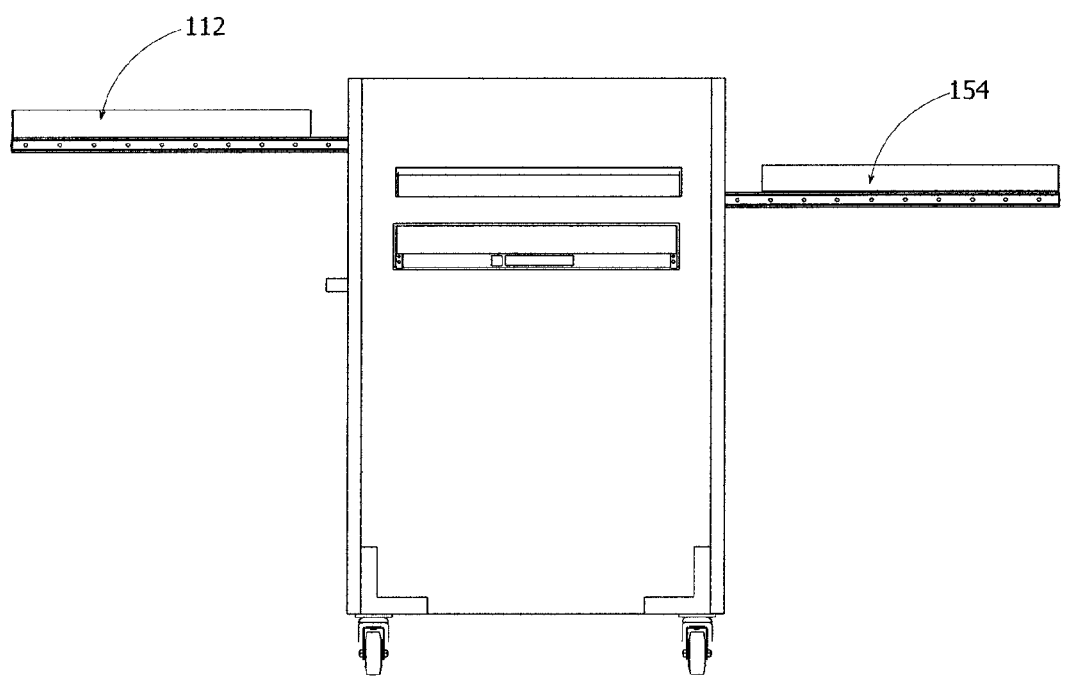
FIG. 17 is a left side view thereof with extended trays.

FIG. 17 depicts a side view, and in this embodiment has a front right tray (112) placed a distance of 41.2 inches (H2) above the floor and rear tray (154) placed 37 inches (H3) above the surface of the floor. The result is the use of two lower trays that allow wheelchair accessibility middle tray (154 and 152) placed along the middle level and tray (110 and 112) located at the highest level. It should also be noted that the stacking of the trays allows for compactness of the utility cart, allowing the trays to be retracted into a position allowing clearance of each tray in a recessed position. While these dimensions are preferred, any other dimensions can also be employed.

Figure 18:
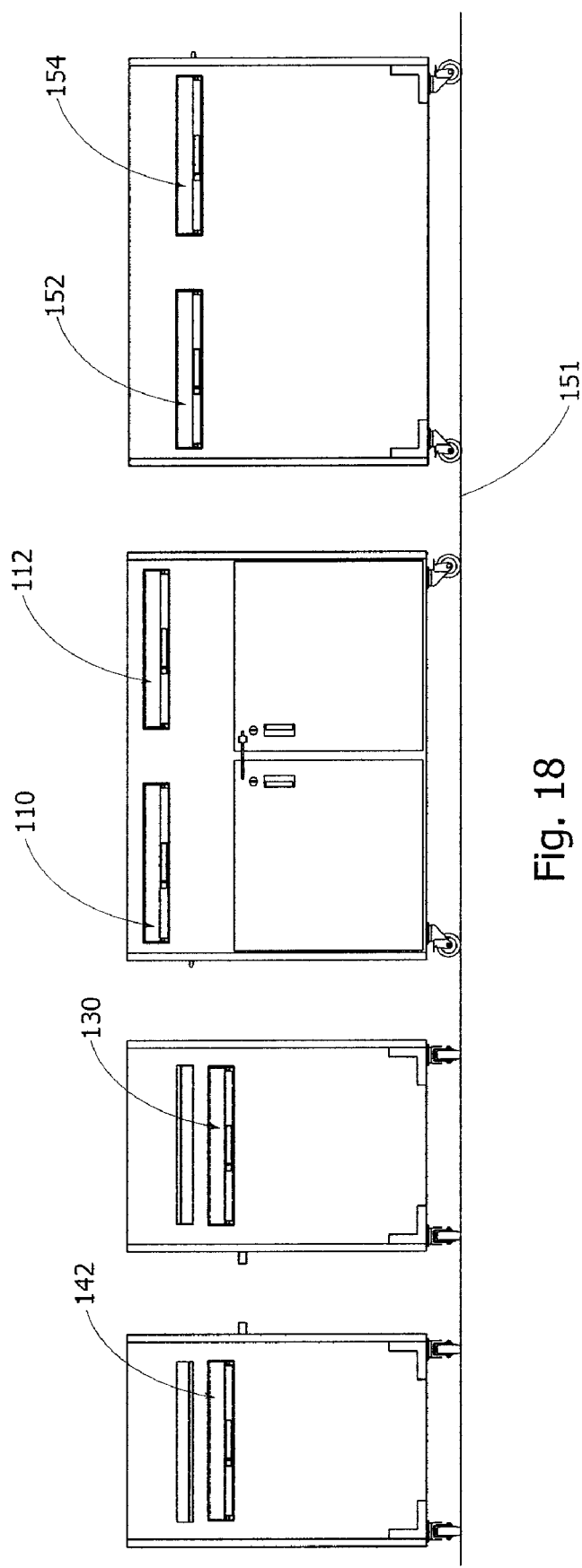
FIG. 18 is a pictorial view of all sides illustrating different voting booth tray heights.
Figure 19:
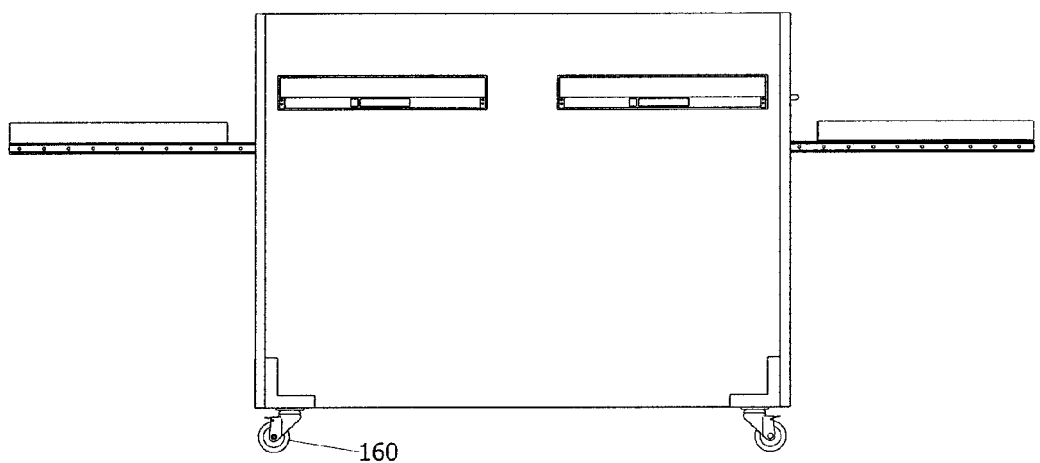
FIG. 19 is a rear view depicting the preferred wheel placement.

FIG. 18 depicts the various heights of the trays (110, 112, 152, 154, 130 and 142) in relation to the floor level (151). FIG. 19 is a rear view depicting a preferred wheel (160) having a diameter of approximately 4 inches and elevating the bottom of the cart approximately 6 inches off the floor or other surface.

Figure 20:
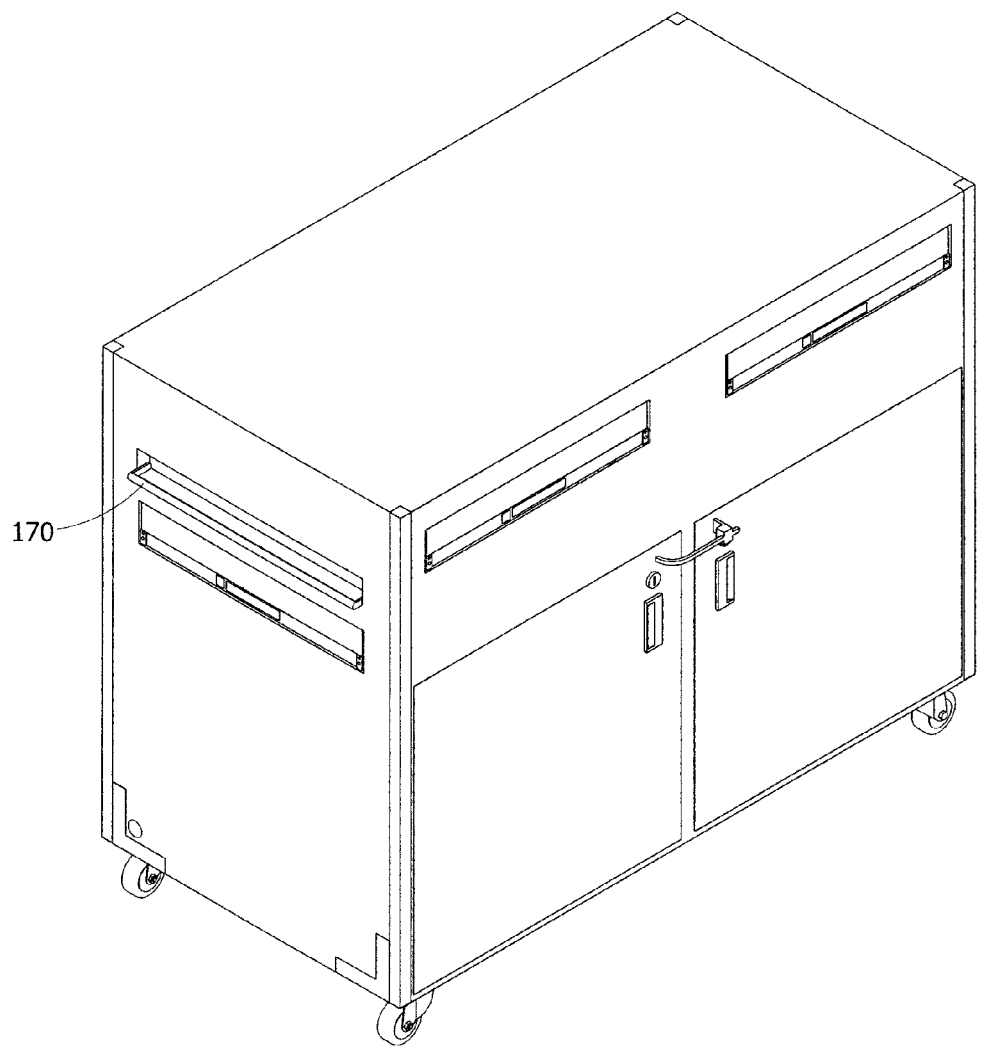
FIG. 20 is a perspective view illustrating the pop out handle.

FIG. 20 is a perspective view illustrating the voting booth having a pop out handle (170) for ease of access in moving of the cart as needed.

Figure 21:
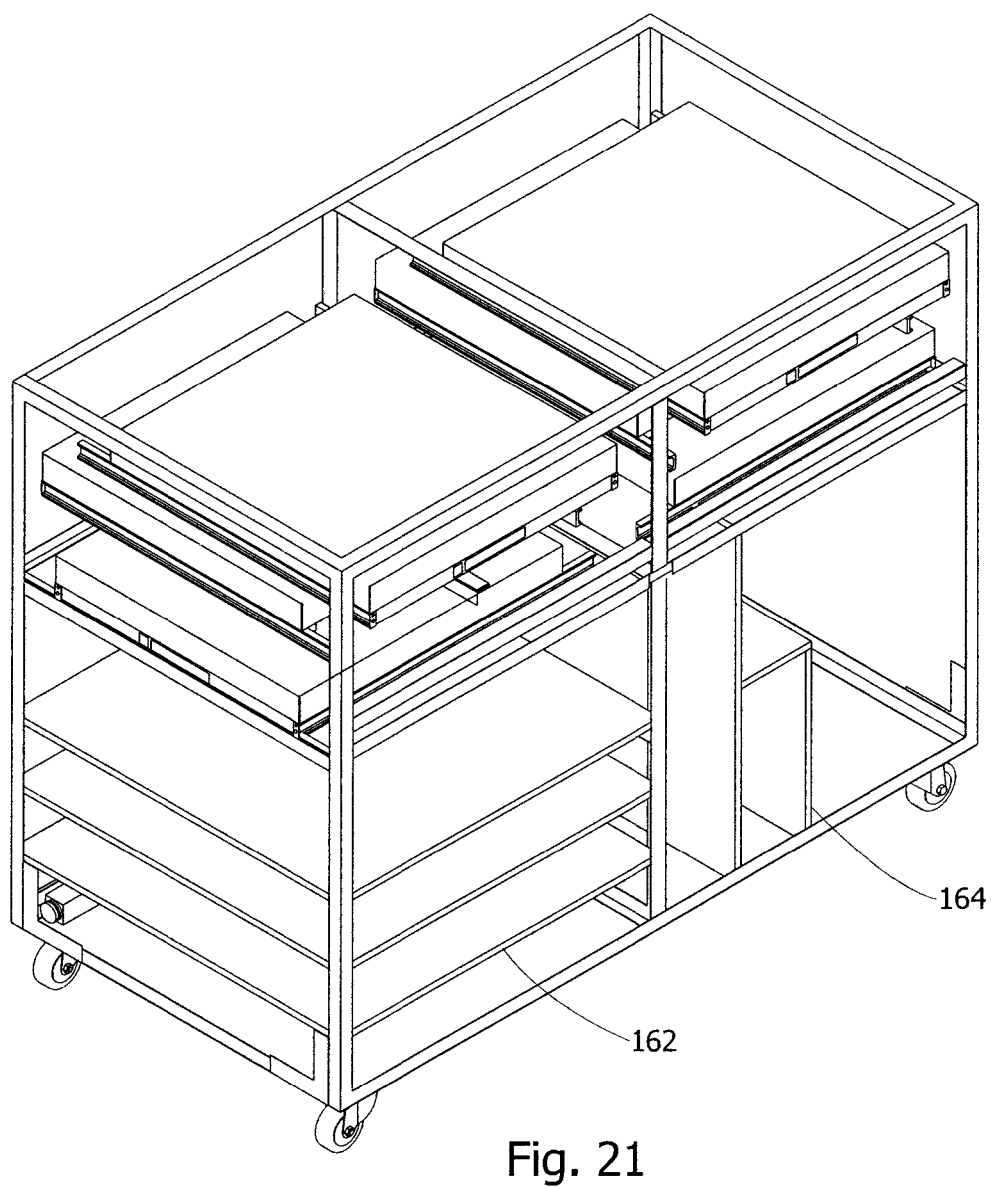
FIG. 21 depicts the voting booth cart with the side panels removed.

FIG. 21 depicts a voting booth with the side panels removed so that the position of the voting booth trays are clearly depicted along the upper portion of the unit and the horizontal trays (162) can be seen beneath the voting booth trays, and vertical dividers (164) for placement of controlling units that function best when placed in an upright position.

Figure 22:
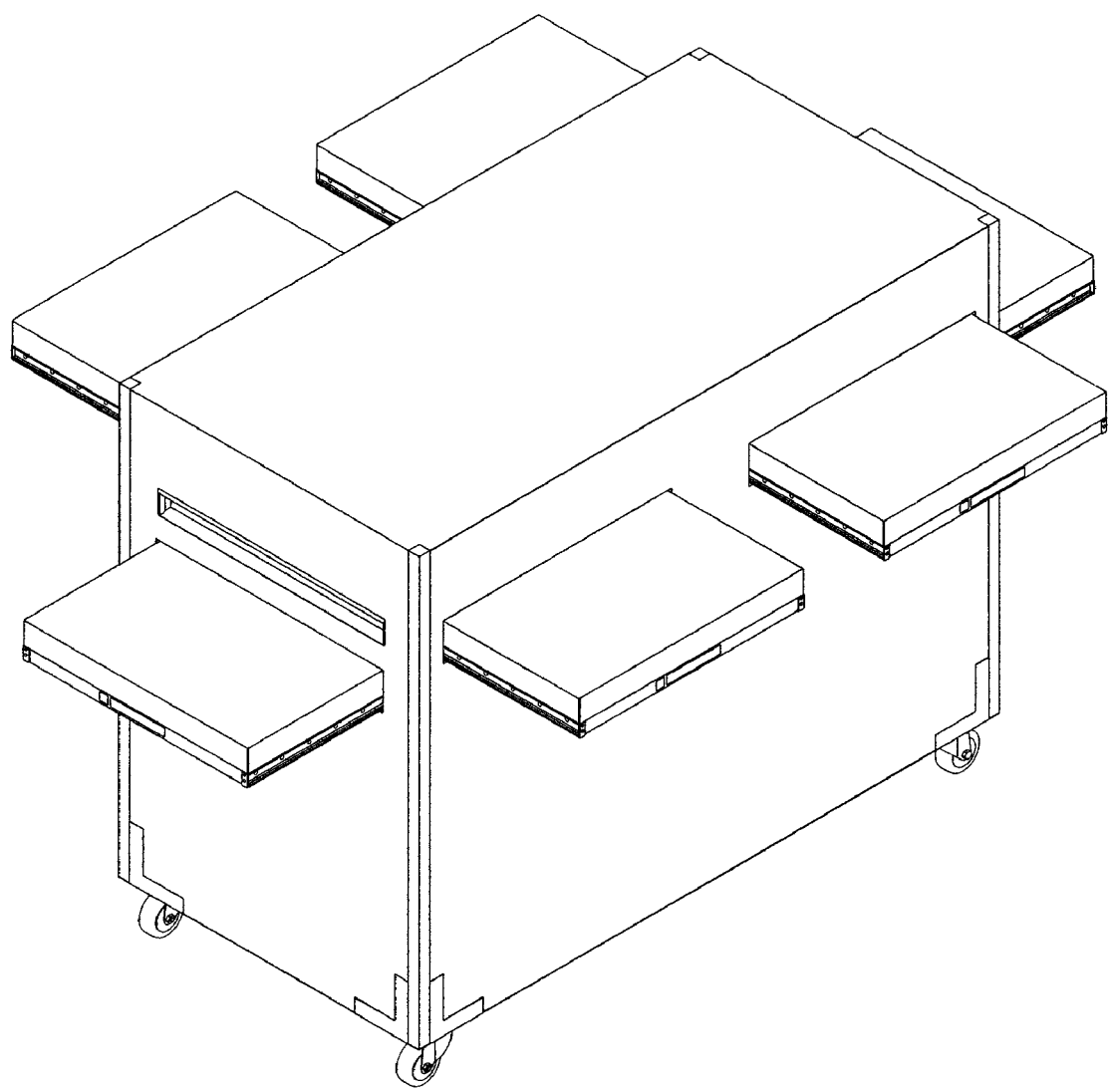
FIG. 22 depicts the voting booth with trays in a partially deployed position.
Figure 23:
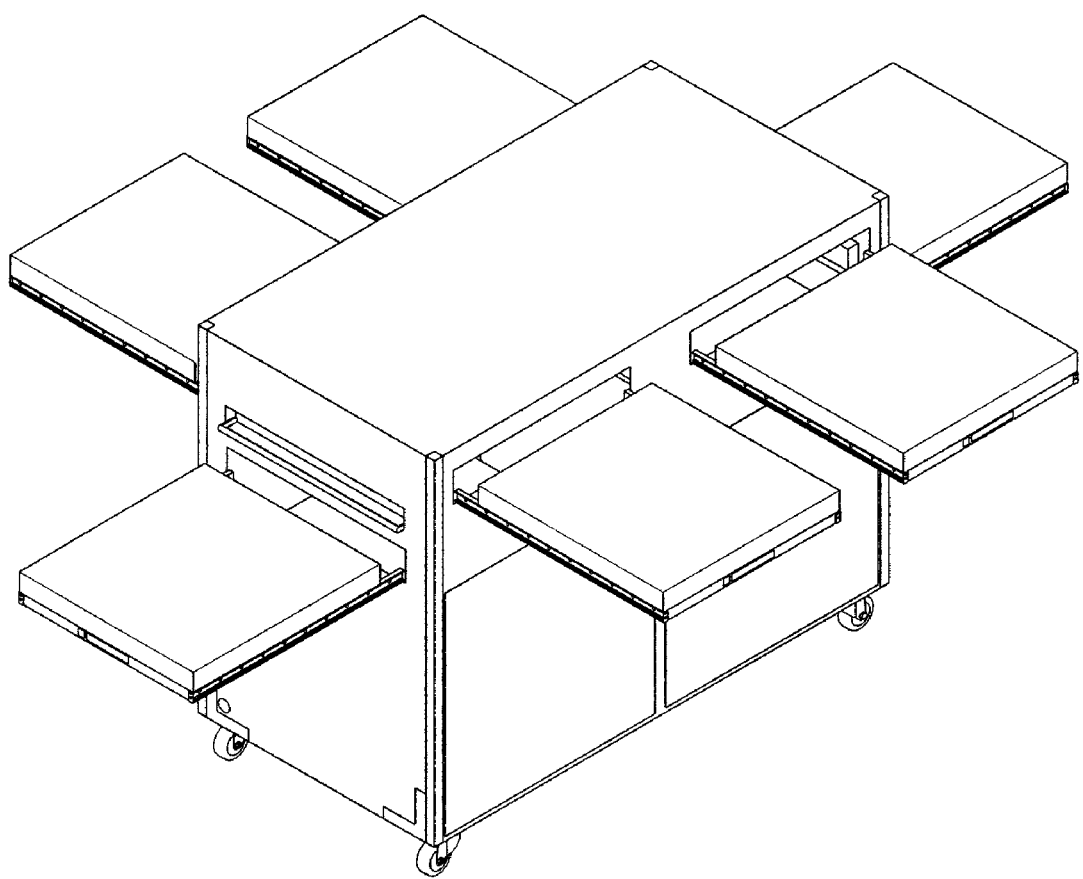
FIG. 23 depicts the voting booth with trays in a fully extended position.
Figure 24:
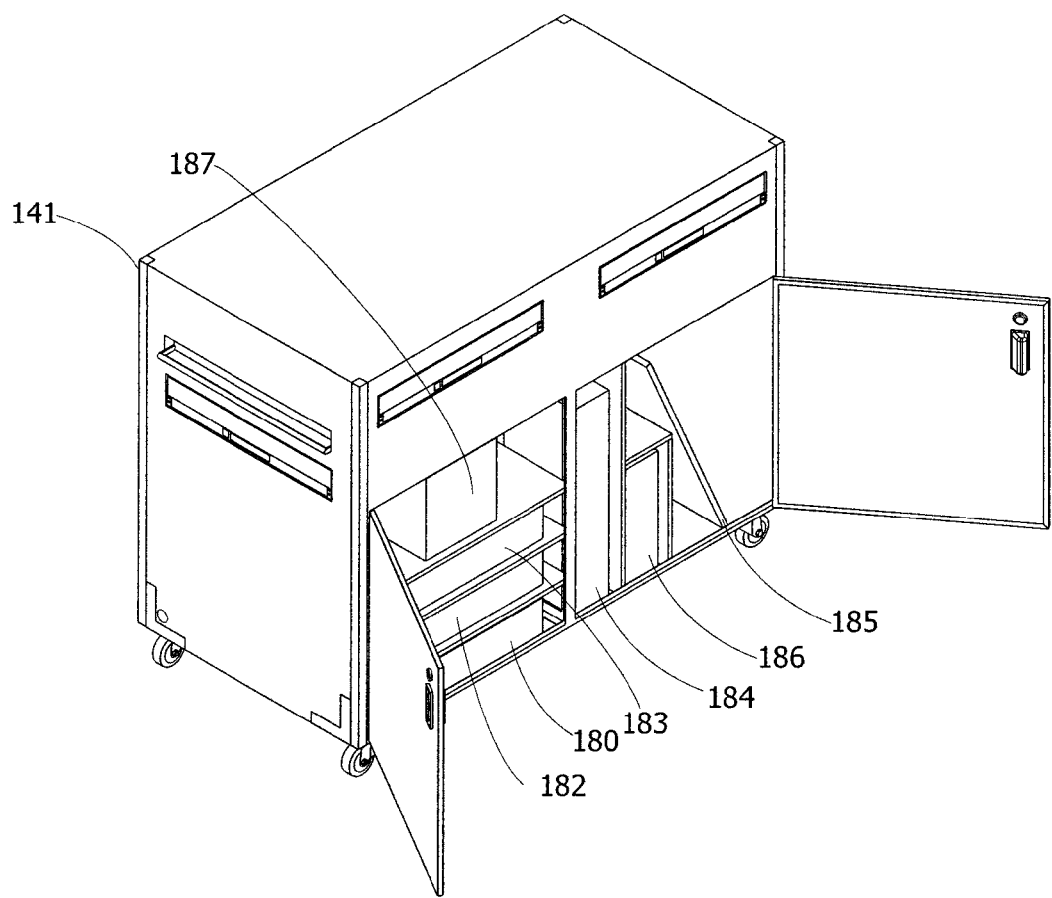
FIG. 24 is a pictorial depicting use of the storage area.
Figure 25:
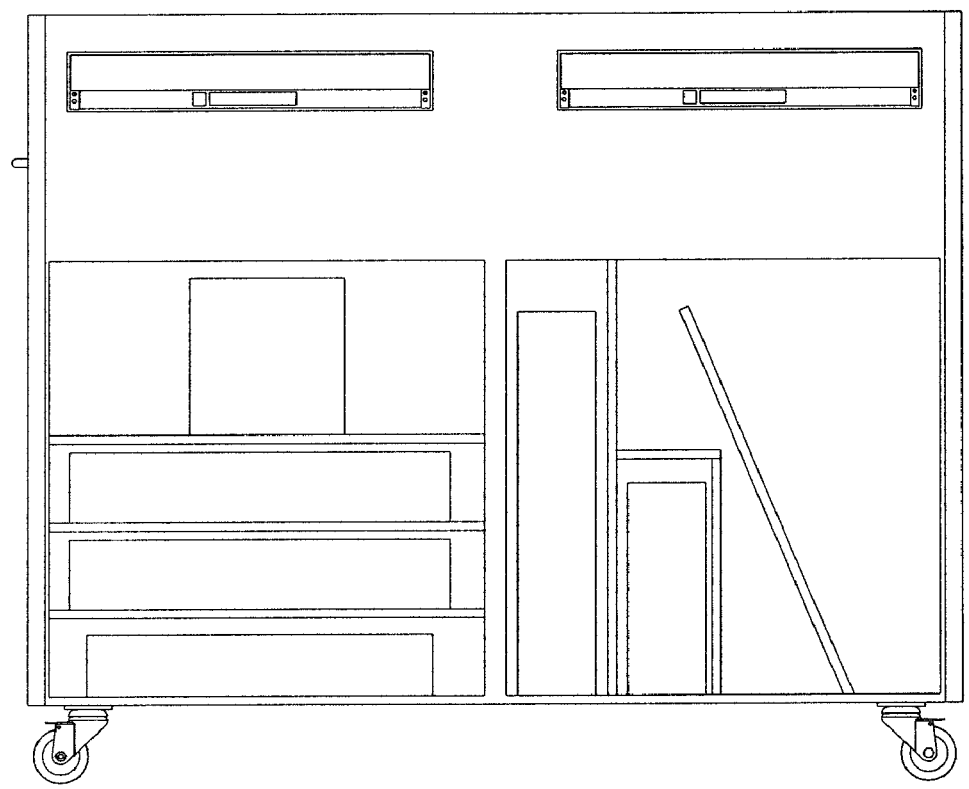
FIG. 25 is a front view of FIG. 24 with the doors removed.
Figure 26:
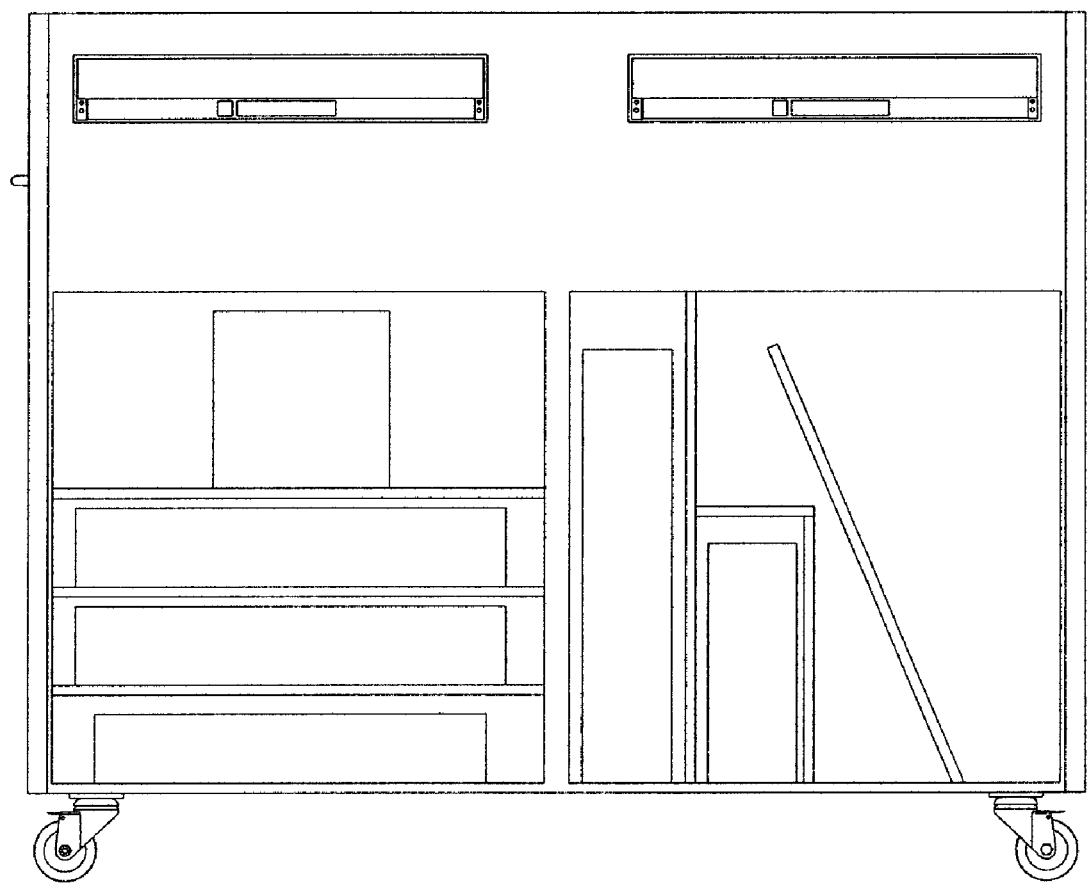
FIG. 26 is another front view of FIG. 24 with the doors removed.
Figure 27:
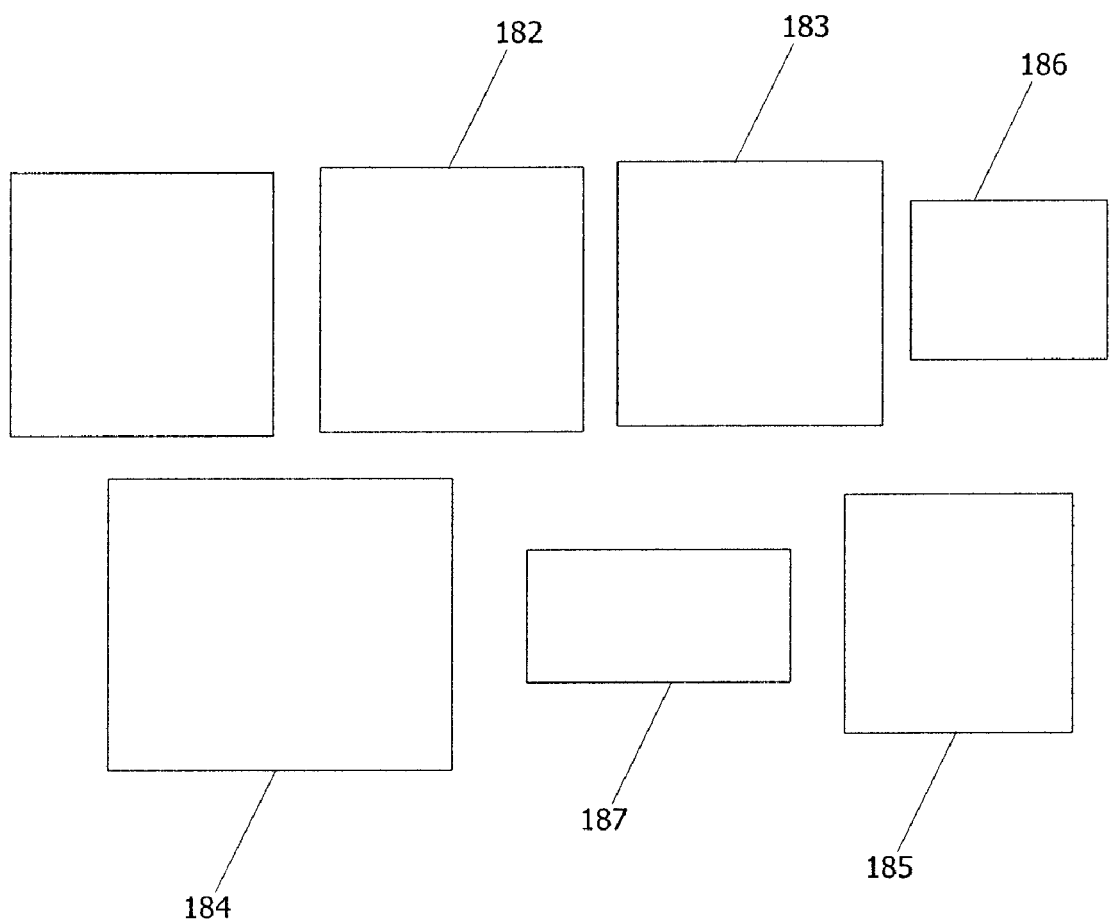
FIG. 27 is a pictorial depicting various storage bags and containers.

FIG. 22 depicts the voting booth trays in a partially deployed position illustrating various elevations of the voting booth trays. FIG. 23 depicts the voting booth trays in a fully extended position from the cart, while still in a collapsed position, further illustrating the various elevations of the various trays. FIG. 24 depicts the utilization of the storage area with various storage bags (180). By way of example, a poll site bag (182) is preferably placed above the ED/AD bag. A BMD supply bag (183) can be placed on a raised shelf. Table display (184) is shown positioned in the upright dividers, emergency ballot box (185) fits within the storage area. Transport bag (186) is positioned within the cavity of the vertical dividers and the ballot container (187) can be placed in the upper shelf. It should be noted that the appearance of the multi-station voting booth can be maintained by the use of rubber corner guards (141) located on each corner to prevent marring of walls, and adjacent containers. FIGS. 25 and 26 further illustrate the position of the bags and boxes described in FIG. 24. FIG. 27 is a depiction of the various sizes of bags and containers that can be position within the voting booth. The ED/AD bag is preferably 20"×20"×4". The Poll Site bag is preferably 20"×20"×3". The BMD supply bag is preferably 20"×20"×3". The Grey Transport Bag is preferably 15"×12"×

3". The Table Display is preferably 26"×22"×4". The Ballot Container with ballots inside is preferably 20"×10"×12". The Emergency Ballot Box is preferably 26"×27"×1".

Figure 28:
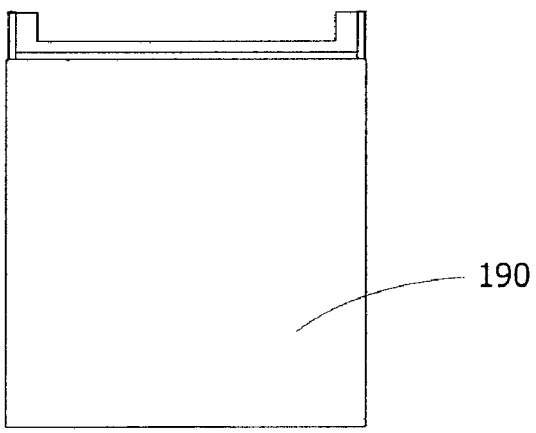
FIG. 28 is a top view of a voting booth tray.
Figure 29:
FIG. 29 is an end view of a voting booth tray.
Figure 30:
FIG. 30 is a side view of a voting booth tray.
Figure 31B:
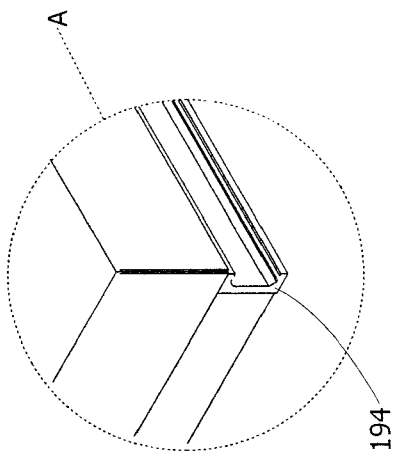
FIG. 31B is an enlarged section of FIG. 31A.
Figure 31A:
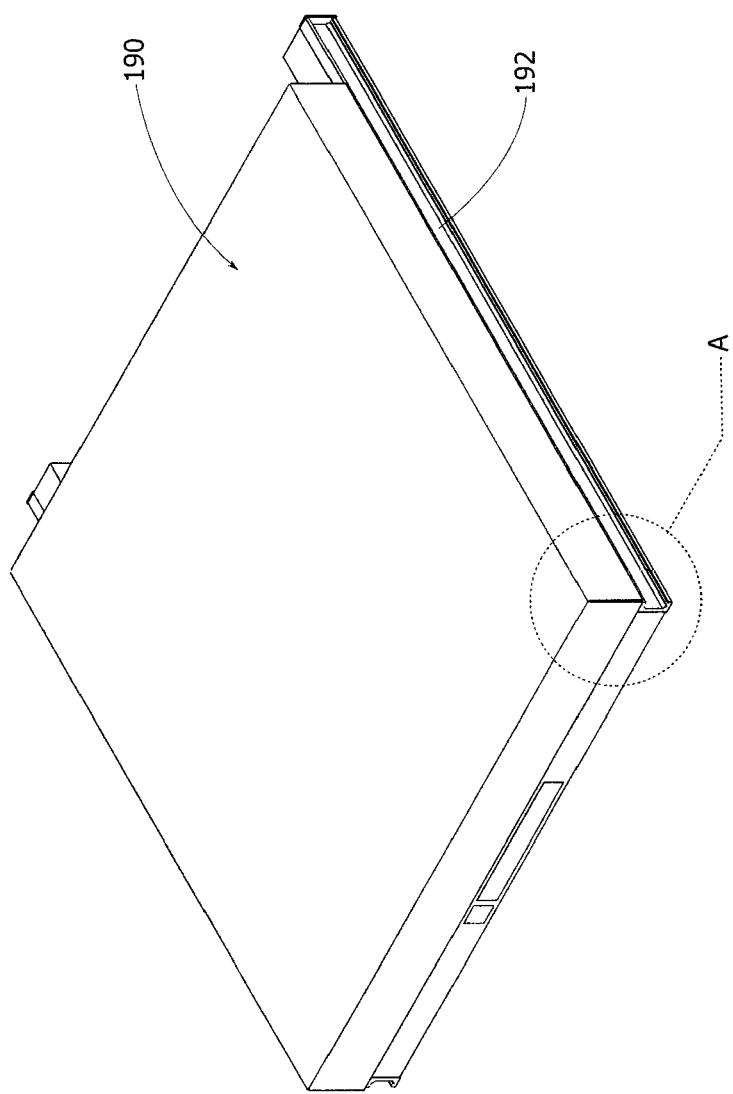
FIG. 31A is a perspective view of the voting booth tray.

FIG. 28 is a top view of the voting booth tray illustrating a depth of 22 inches. FIG. 29 is an end view showing a width of 20.45 inches. The thickness of the voting booth tray in a collapsed position is 2 inches. The thickness of the voting booth tray support platform is 2 inch. FIG. 30 depicts the side view of the voting booth tray using a drawer guide for use in extension and extraction. FIG. 31A depicts the voting booth tray from (190) on the guide (192). An enlarged view as shown in FIG. 31B illustrates the slide (194) for ease of moving between a storage position and a deployed position.

Figure 32B:
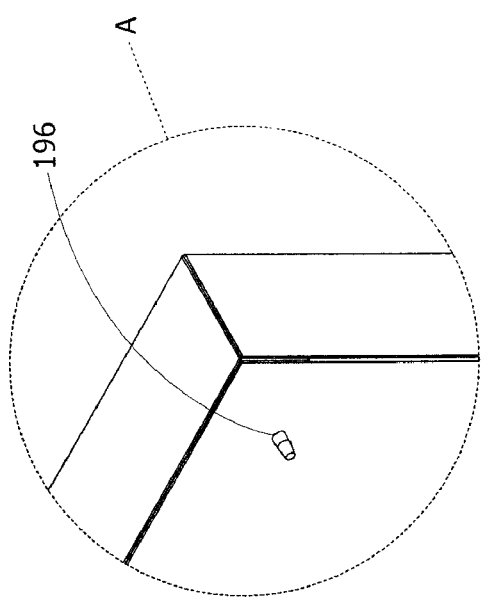
FIG. 32B is an enlarged section of FIG. 32A.
Figure 32A:
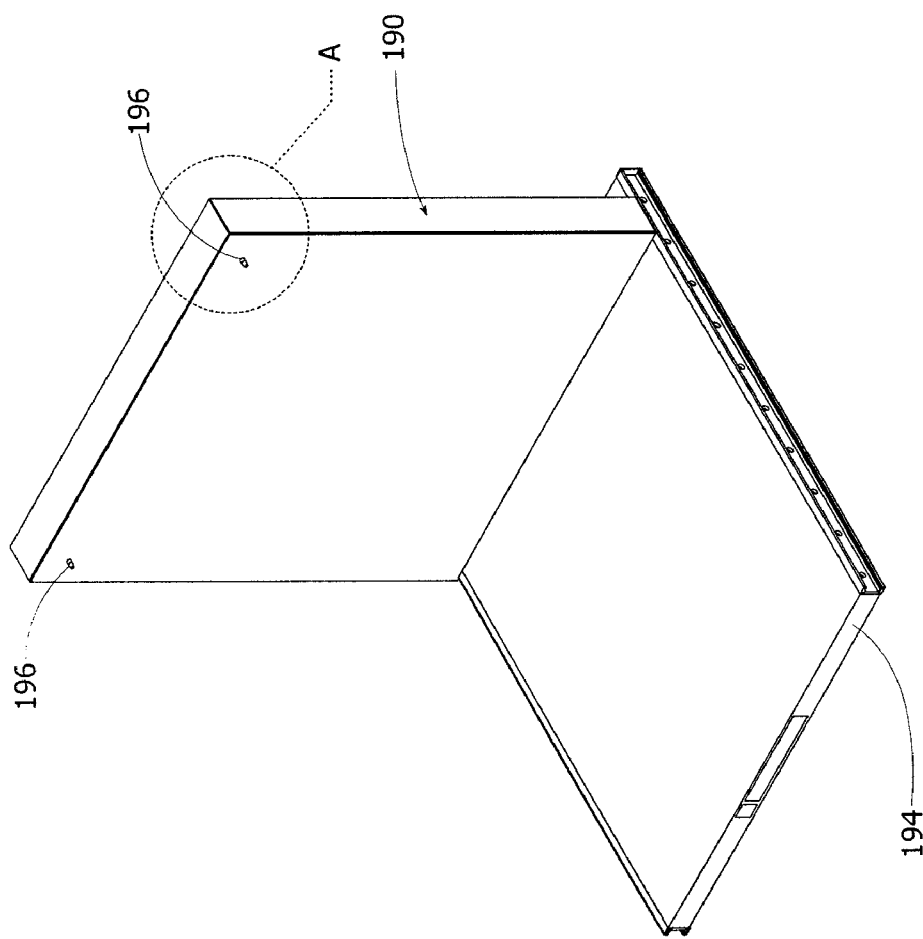
FIG. 32A depicts the voting booth shield in a raised position.
Figure 33:
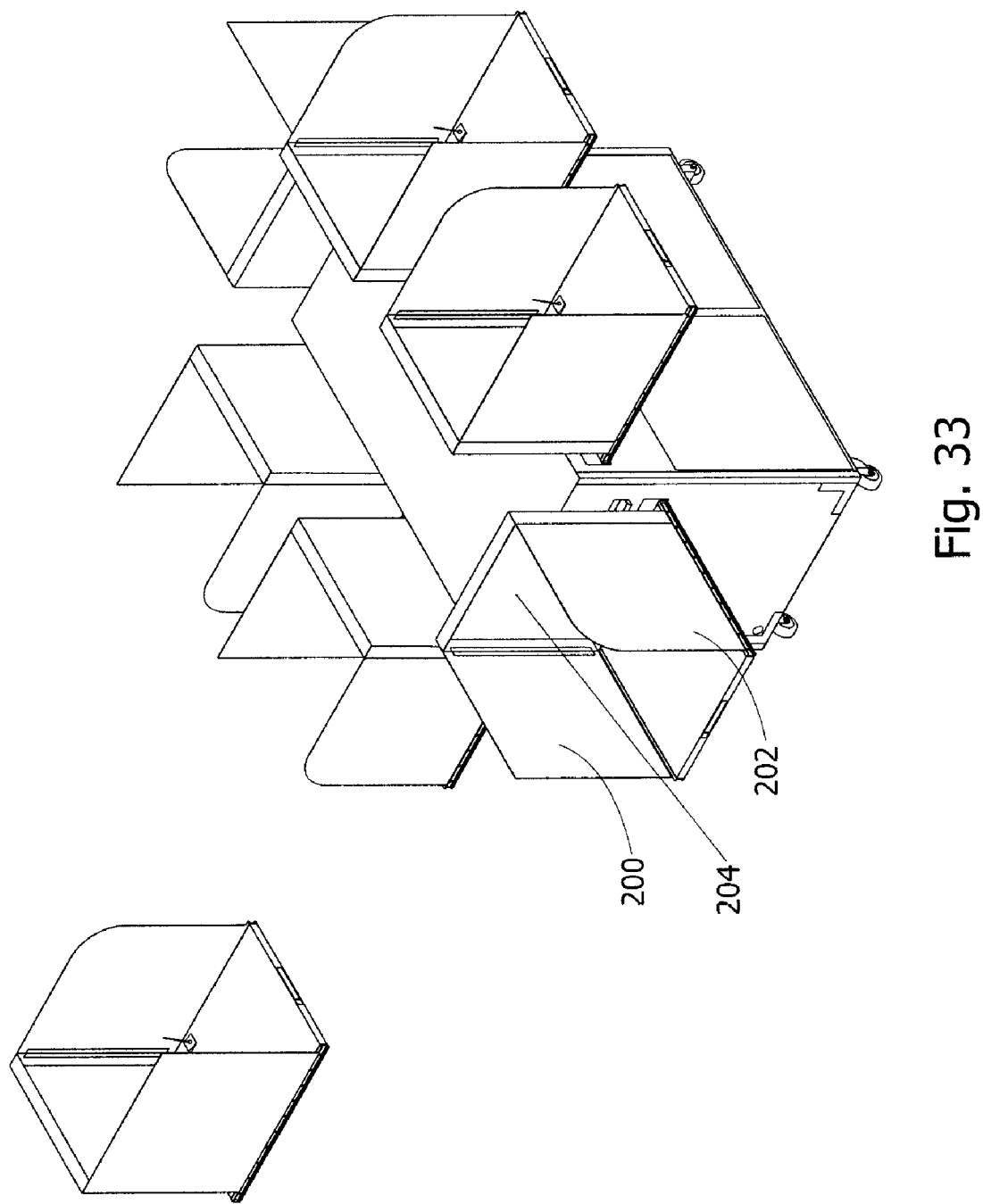
FIG. 33 is a pictorial view of an alternative embodiment of a voting booth.
Figure 34:
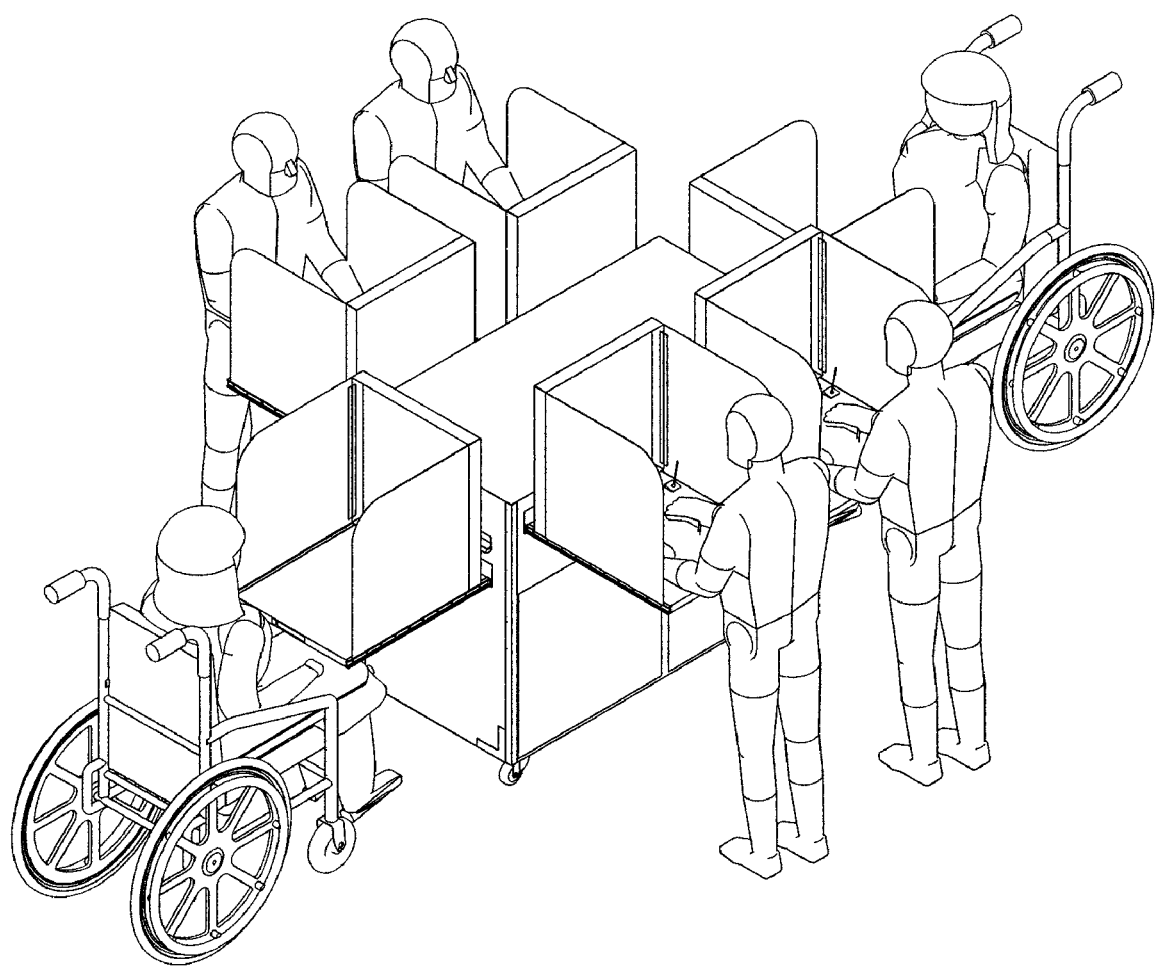
FIG. 34 is another pictorial view thereof.
Figure 35:
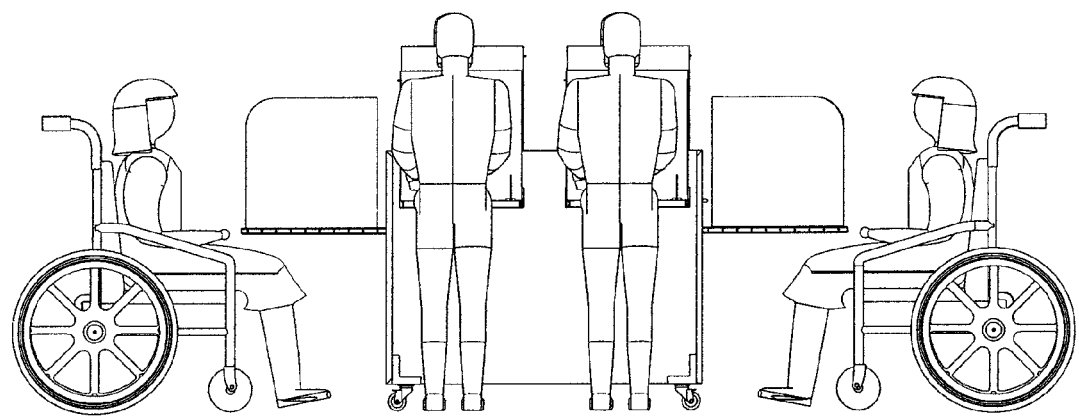
FIG. 35 is a front pictorial view thereof.
Figure 36:
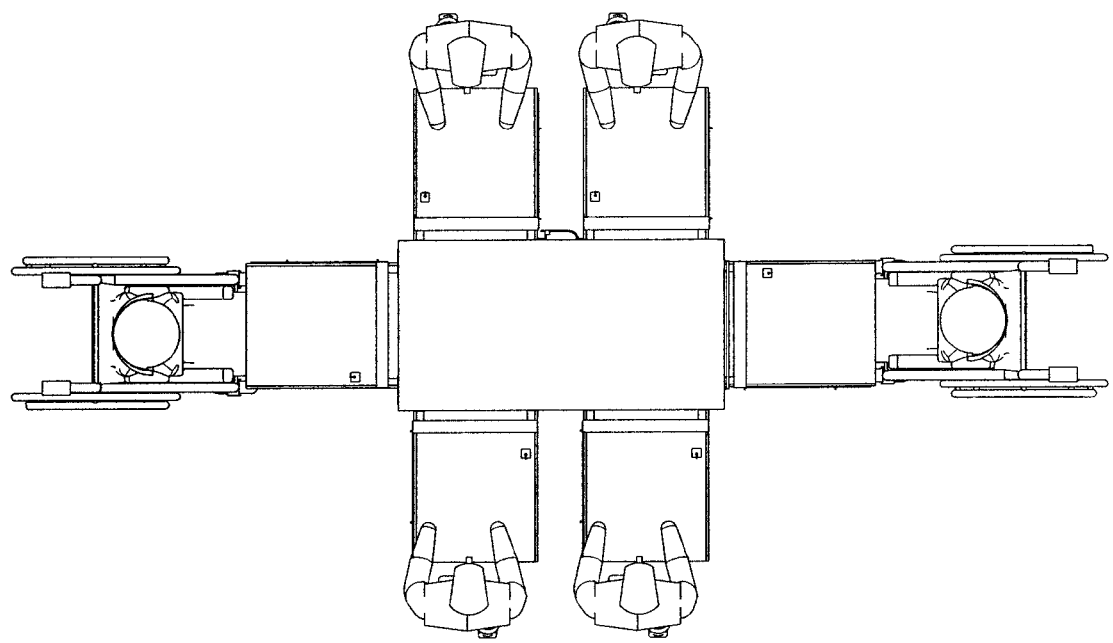
FIG. 36 is a top pictorial view thereof.
Figure 37:
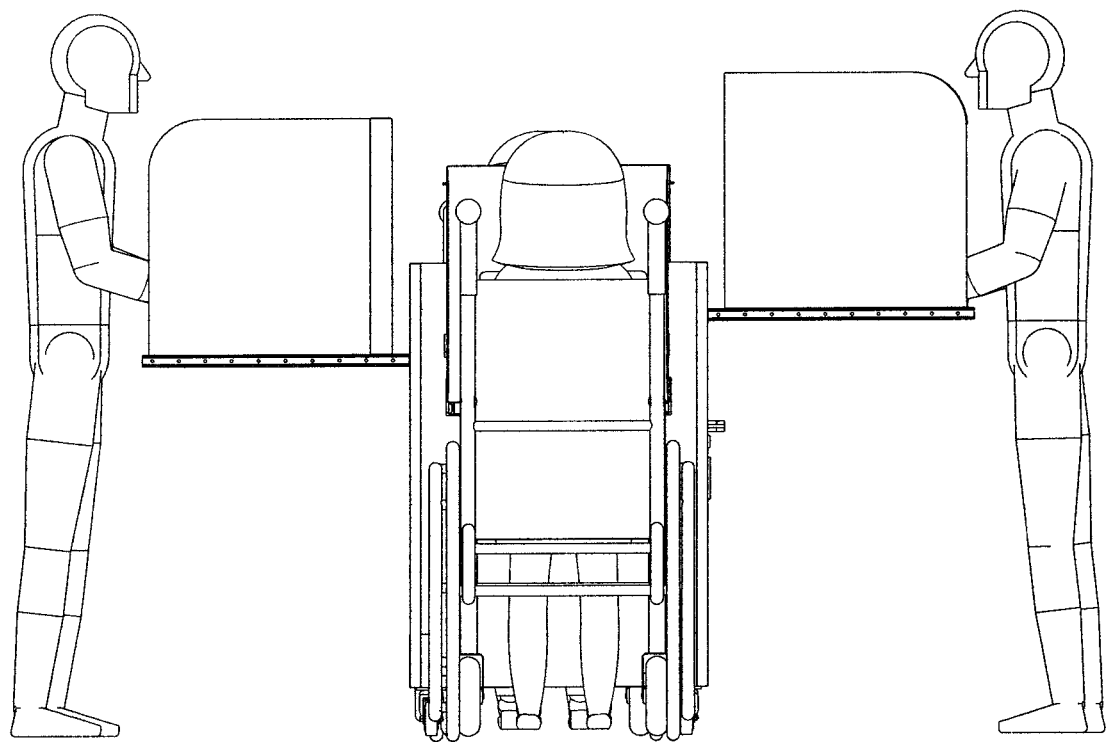
FIG. 37 is an end pictorial view thereof.
Figure 38:
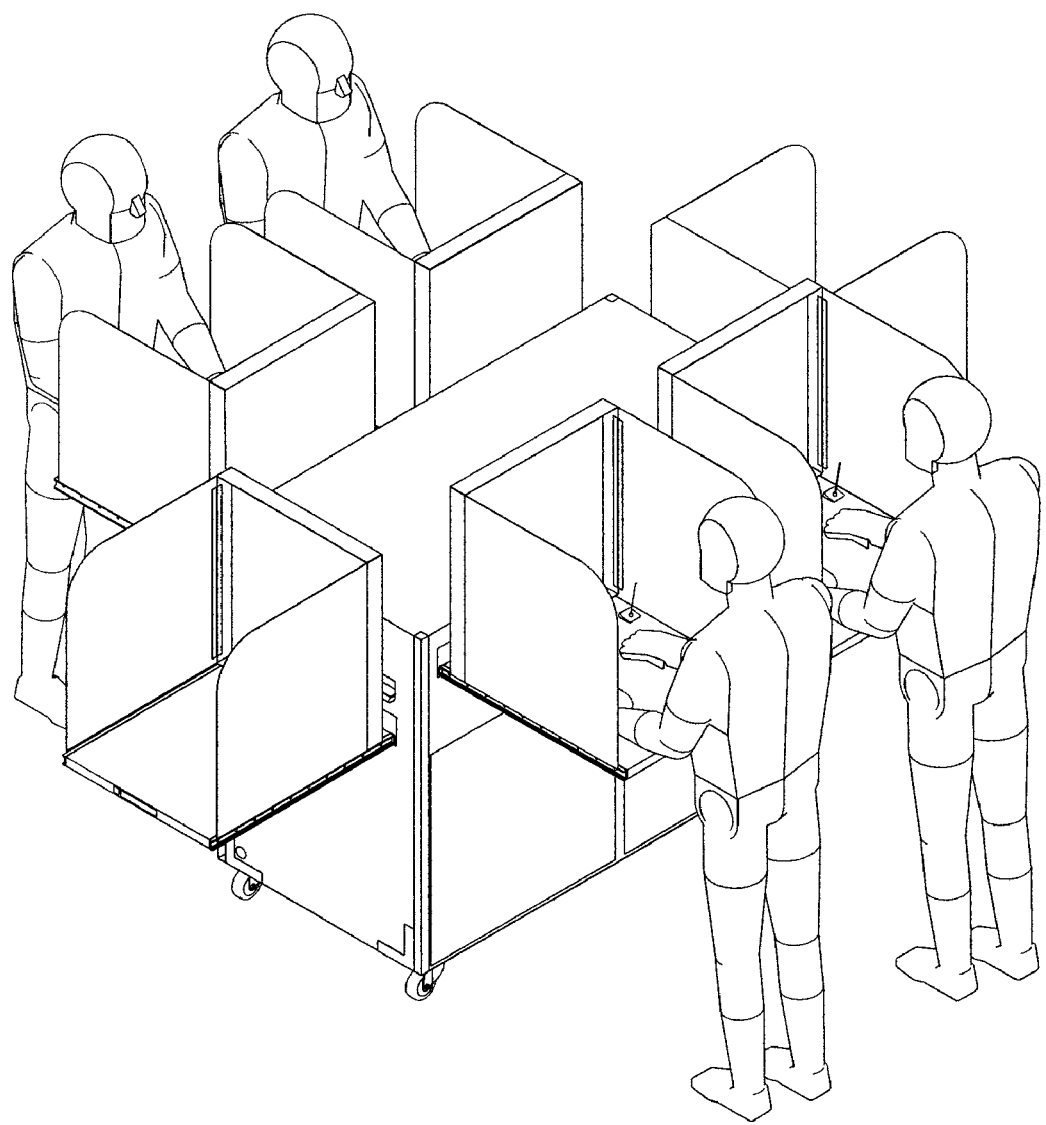
FIG. 38 is a perspective pictorial view thereof.
Figure 39:
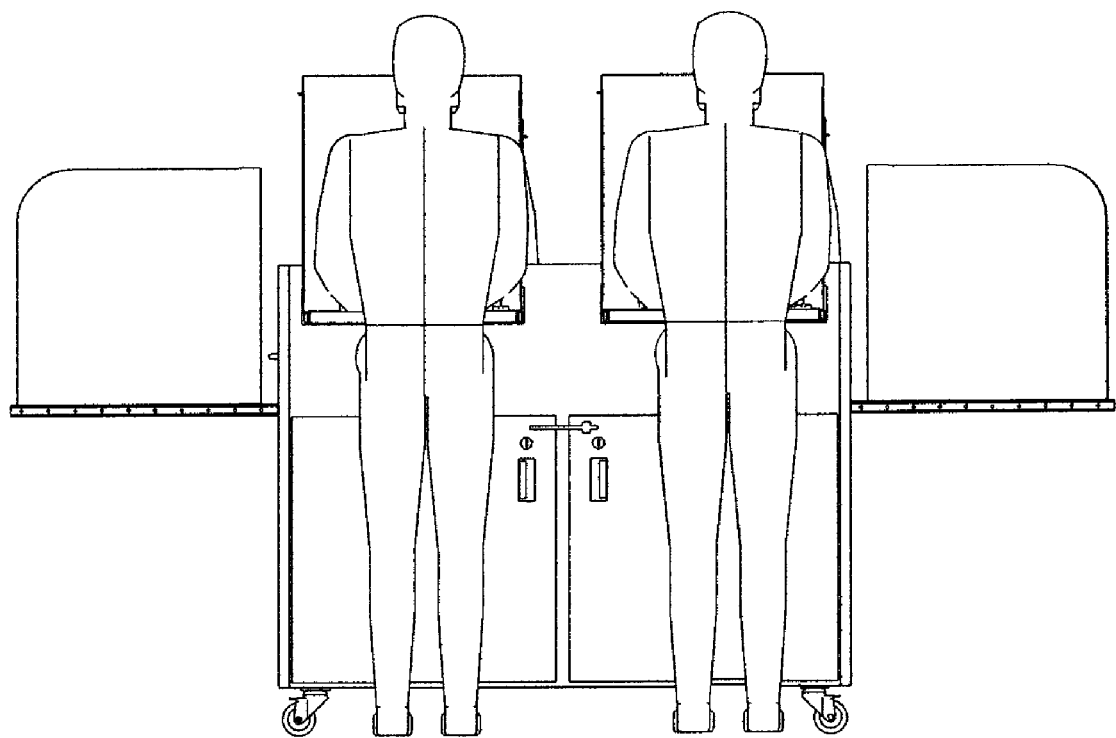
FIG. 39 depicts placement of storage units.
Figure 40:
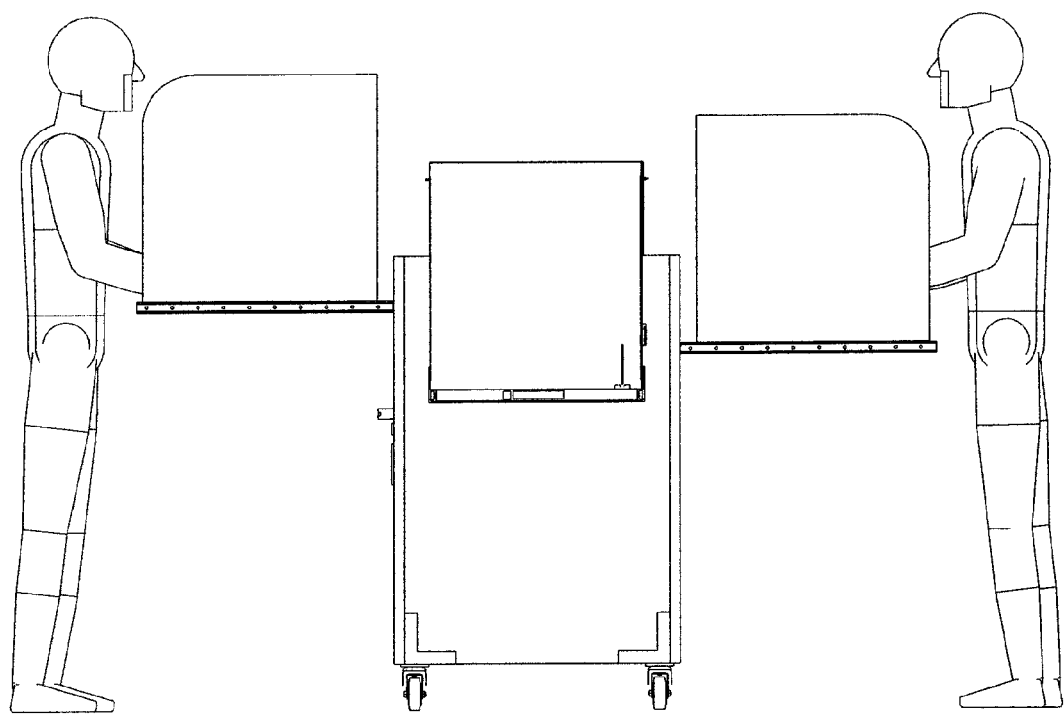
FIG. 40 illustrates the width of the storage container.

FIG. 32A depicts the voting booth shield (190) in a raised position over platform (194). Detail A in FIG. 32B illustrates a rubber locking latch (196) positioned on each of the corners so as to maintain the covers in a storage position, and further providing a cushion so as not to mar the surface (194). FIG. 33 depicts the voting booth in a deployed position each having a side panel (200), right panel (202) and rear panel (204). As previously mentioned, the panels may be placed in a position by the use of a spring loaded latch key or by use of a magnet. It would be obvious to one skilled in the art that most any type of latching mechanism can be used to maintain side panels in a fixed position including the use of a tiny groove attachment, hook and loop securement, or simply a post and aperture are all such examples. FIG. 34 is a pictorial view of the voting booth with individuals standing up as well as seated in a wheelchair. FIG. 35 is a front view showing individuals at each of the voting stations with the elevation of each individual illustrated. FIG. 36 is a pictorial view from a top position depicting the space available to each of the individuals utilizing the voting stations. FIG. 37 is an end view depicting a view from a wheelchair position with an overall width of 28.16 inches of the cart itself. FIG. 38 is a pictorial view of the voting stations. In this embodiment, additional storage can be placed beneath the wheelchair ends if suitable wheelchair accessories have been provided. FIG. 39 depicts the size of the storage unit that can be placed beneath the end units, namely a 30 inch tall×20 inch deep storage container. FIG. 40 illustrates the width of the storage container can be up to 30 inches placed beneath the end shelving.

Figure 41:
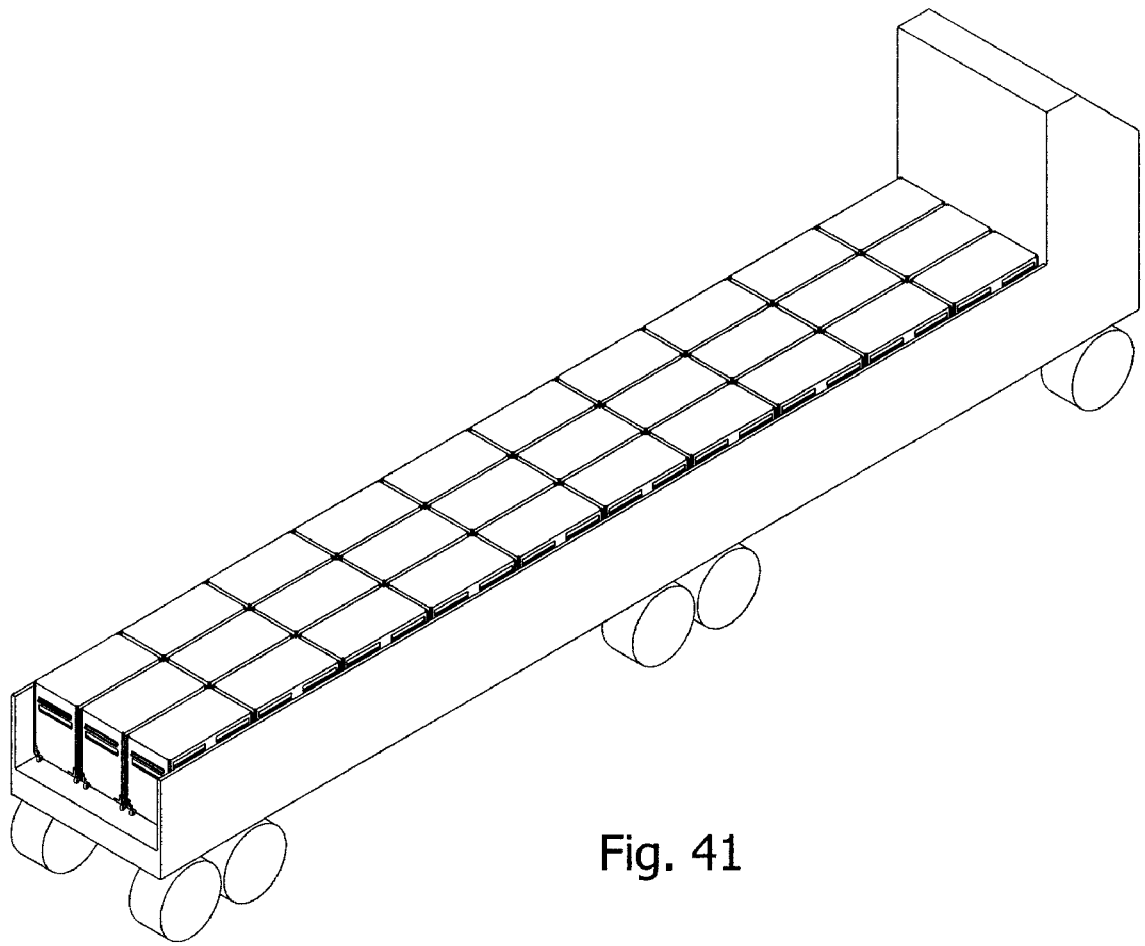
FIG. 41 is a pictorial of truck transportation of a plurality of the storage/utility carts.
Figure 43:
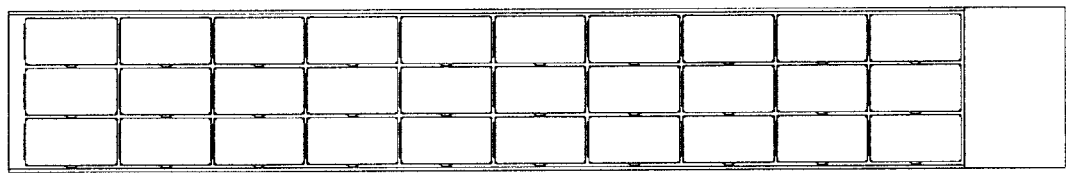
FIG. 43 is a top view thereof.
Figure 42:
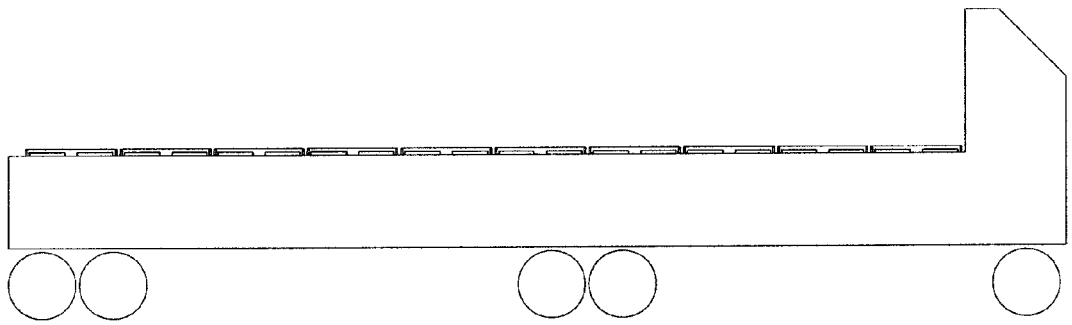
FIG. 42 is a side view thereof.

FIG. 41 depicts the utilization of a truck for transportation of multiple voting booths with storage/utility cart. A conventional truck can hold 30 voting booths on a single truck which translates to 180 voting stations. FIG. 42 depicts a side view of a truck having a length of 576 inches or 48 feet. FIG. 43 is a top view of the truck depicting the 30 voting booths with the width of the truck being 96 inches or 8 feet.

Figure 46:
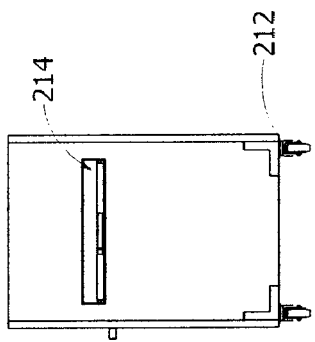
FIG. 46 is a right side view thereof.
Figure 44:
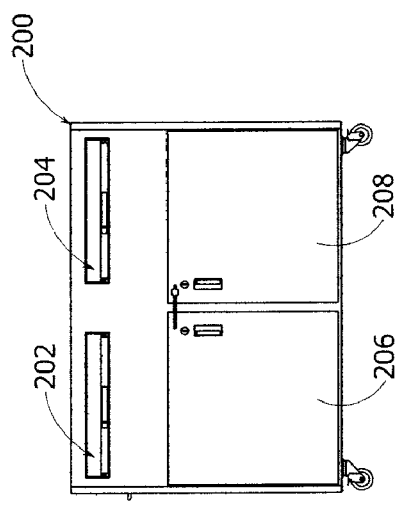
FIG. 44 is a front view of the voting booth with storage/utility cart of another embodiment of the present invention.
Figure 45:
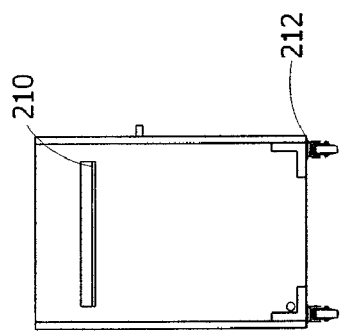
FIG. 45 is a left side view thereof.
Figure 47:
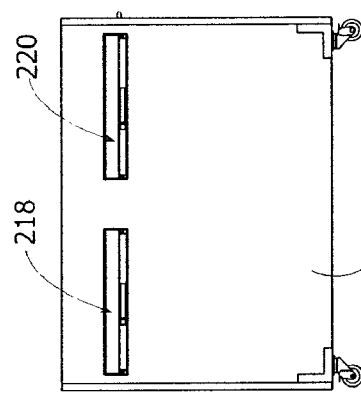
FIG. 47 is a rear view thereof.
Figure 48:
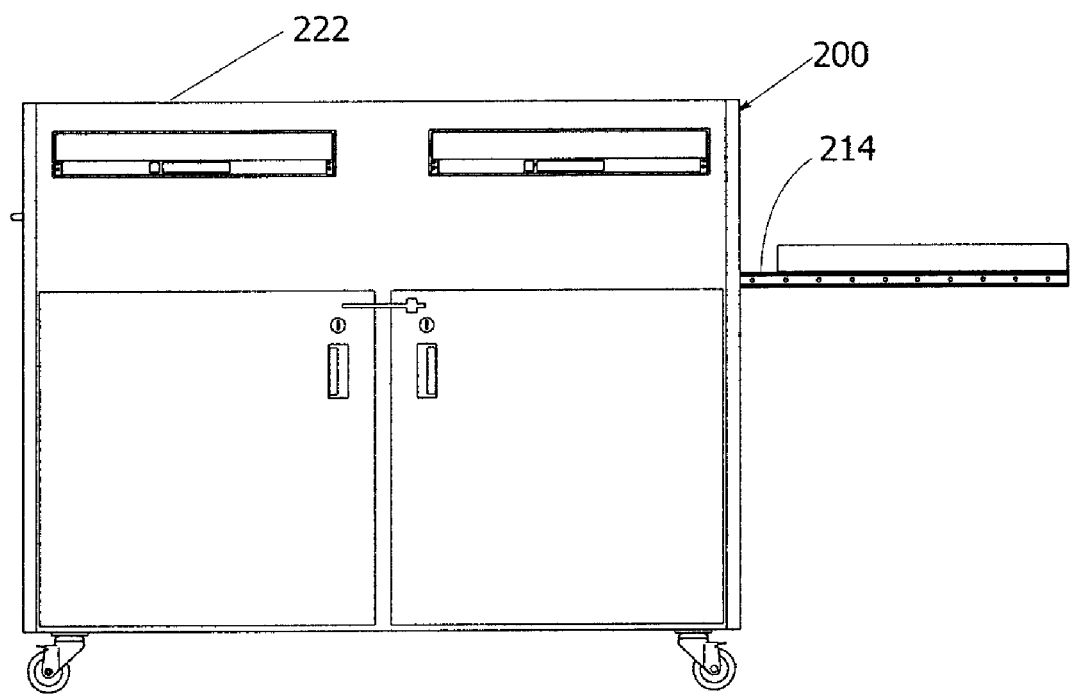
FIG. 48 is a front view thereof.

FIG. 44 is a front view of an alternative embodiment having the voting booth (200) with a left voting booth tray (202), right voting booth tray (204), left access door (206) and right access door (208). In the embodiment the left side, shown in FIG. 45, has a tray (210) located about 27 inches from the base (212) of the unit. FIG. 46 depicts the right side with the voting booth tray (214) at 26 inches above the base (212) of the unit. FIG. 47 depicts the rear (216) of the unit with left tray (218) and right tray (220). Now referring to FIG. 48, the dimensions of the unit (200) from the floor to the top (222) of 43.5 inches is illustrated, and from the floor to the right tray (214) the distance if 33 inches.

Figure 49:
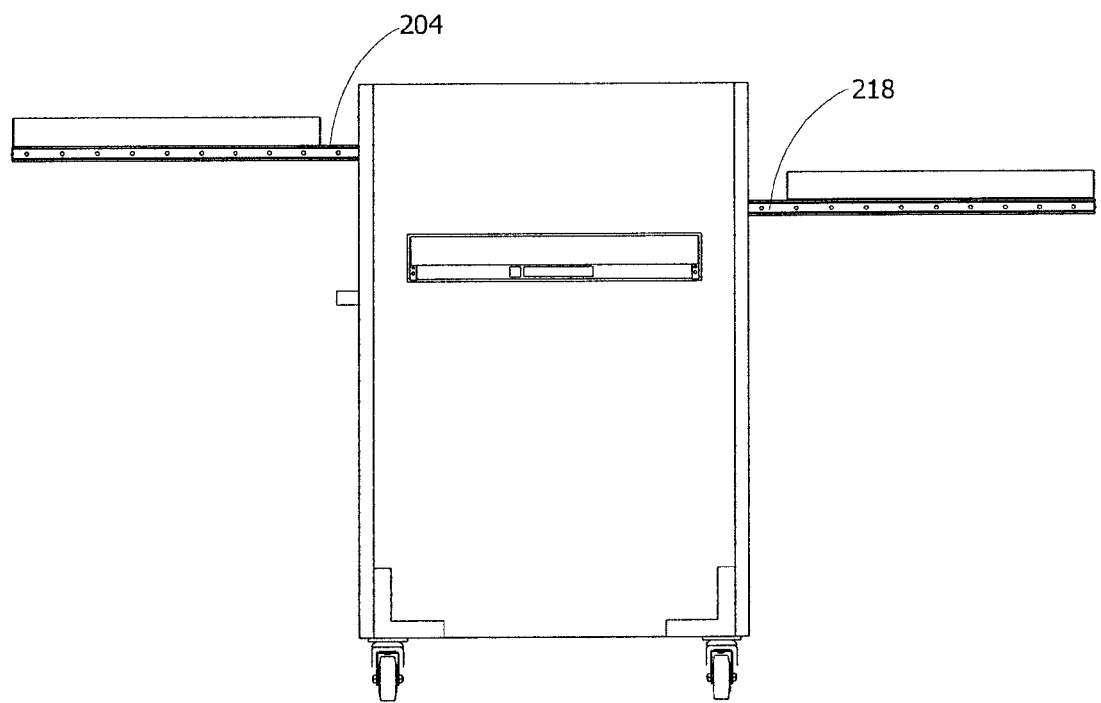
FIG. 49 is a right side view depicting measurements.

The right side view is further shown in FIG. 49 so as to depict the front right tray (204) which is approximately 40 inches above the floor and rear tray (218) which is 36 inches above the floor.

Figure 50:
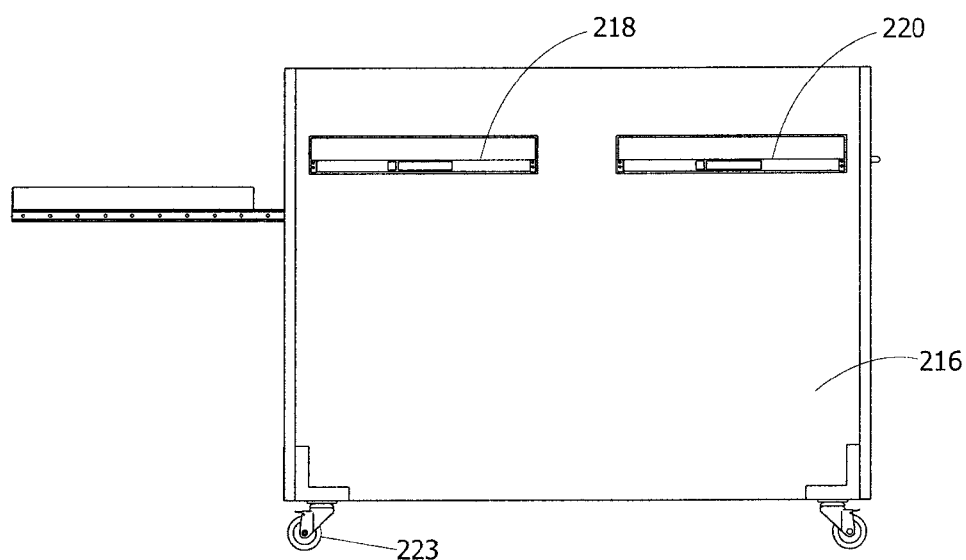
FIG. 50 is a rear view thereof.
Figure 51:
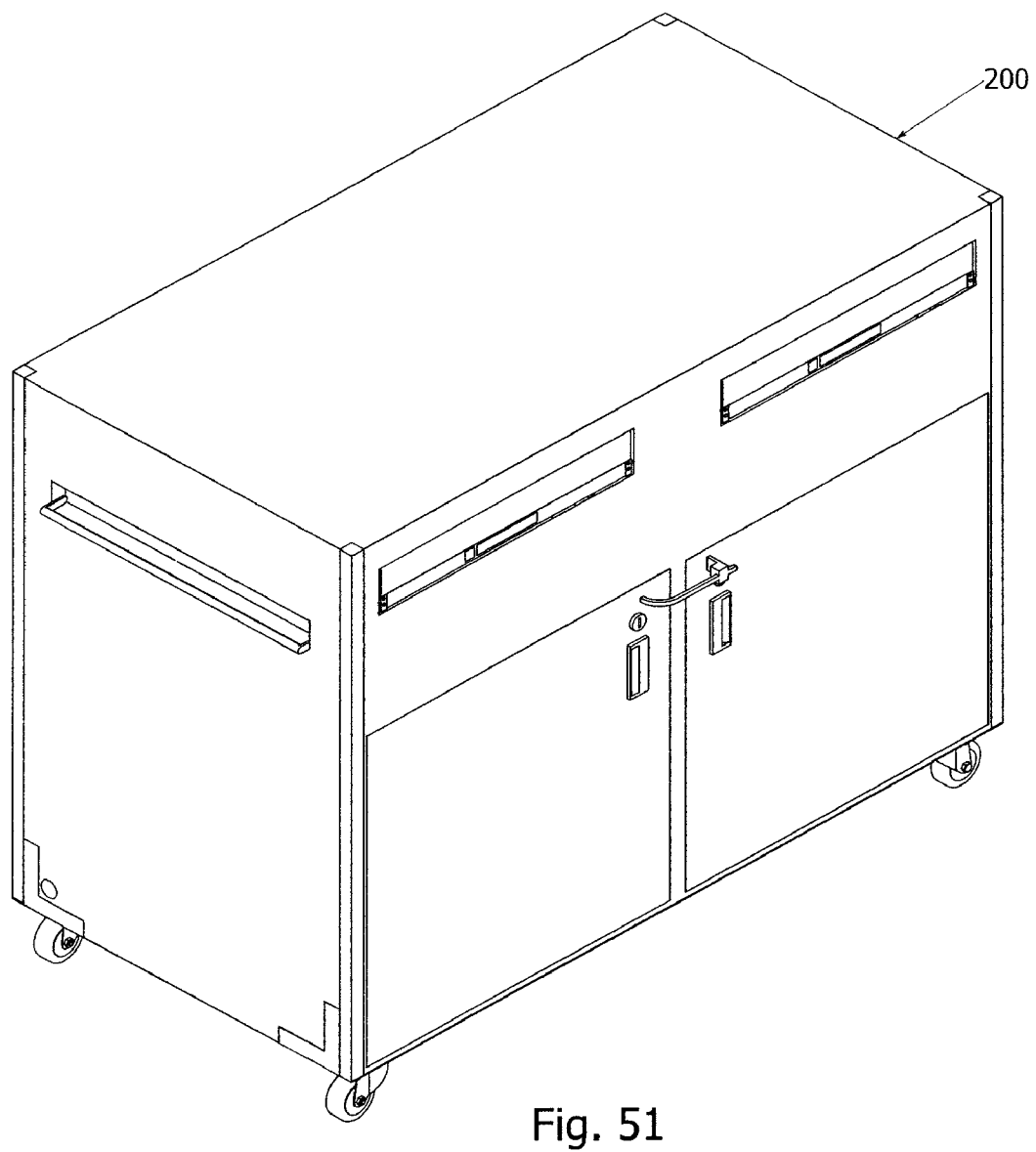
FIG. 51 is a perspective view thereof.
Figure 52:
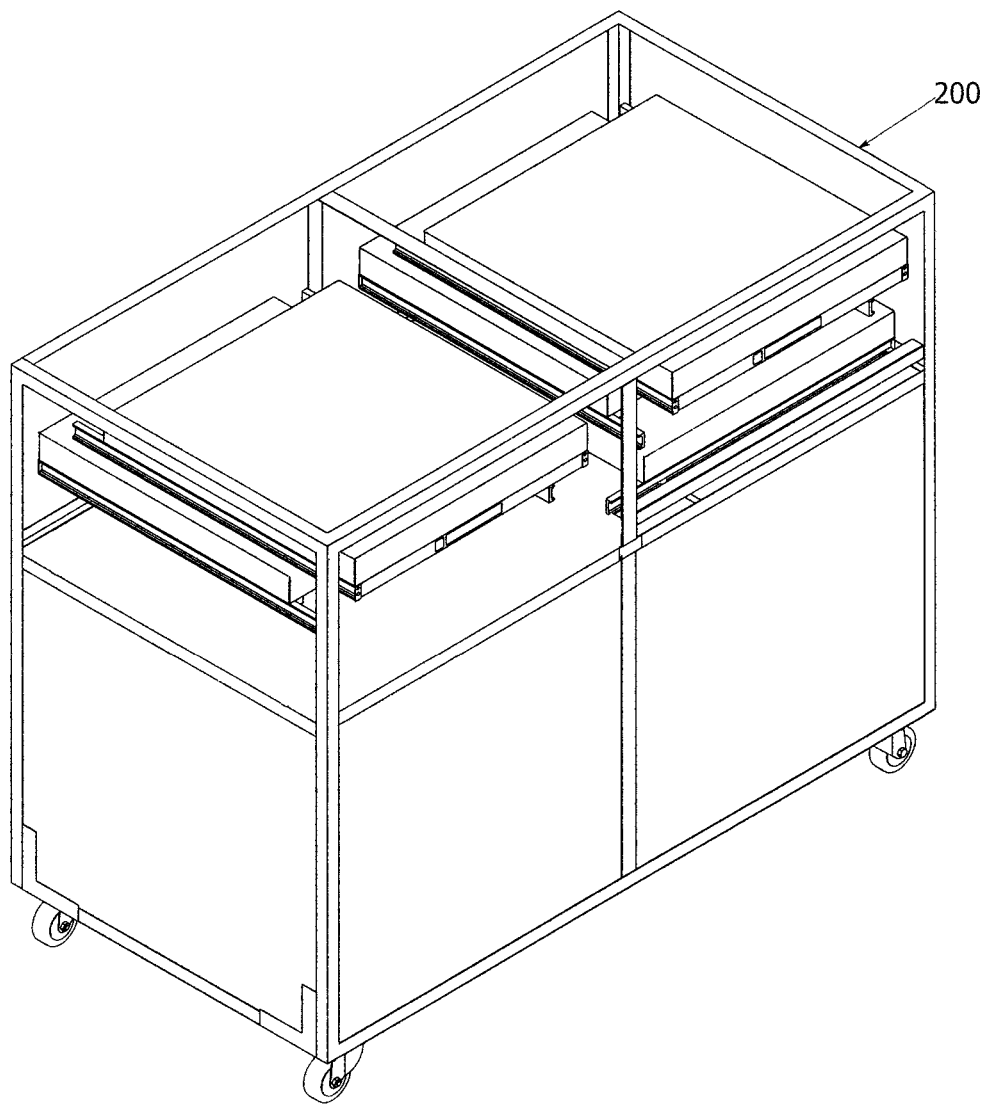
FIG. 52 is a perspective view thereof without cover panels.
Figure 53:
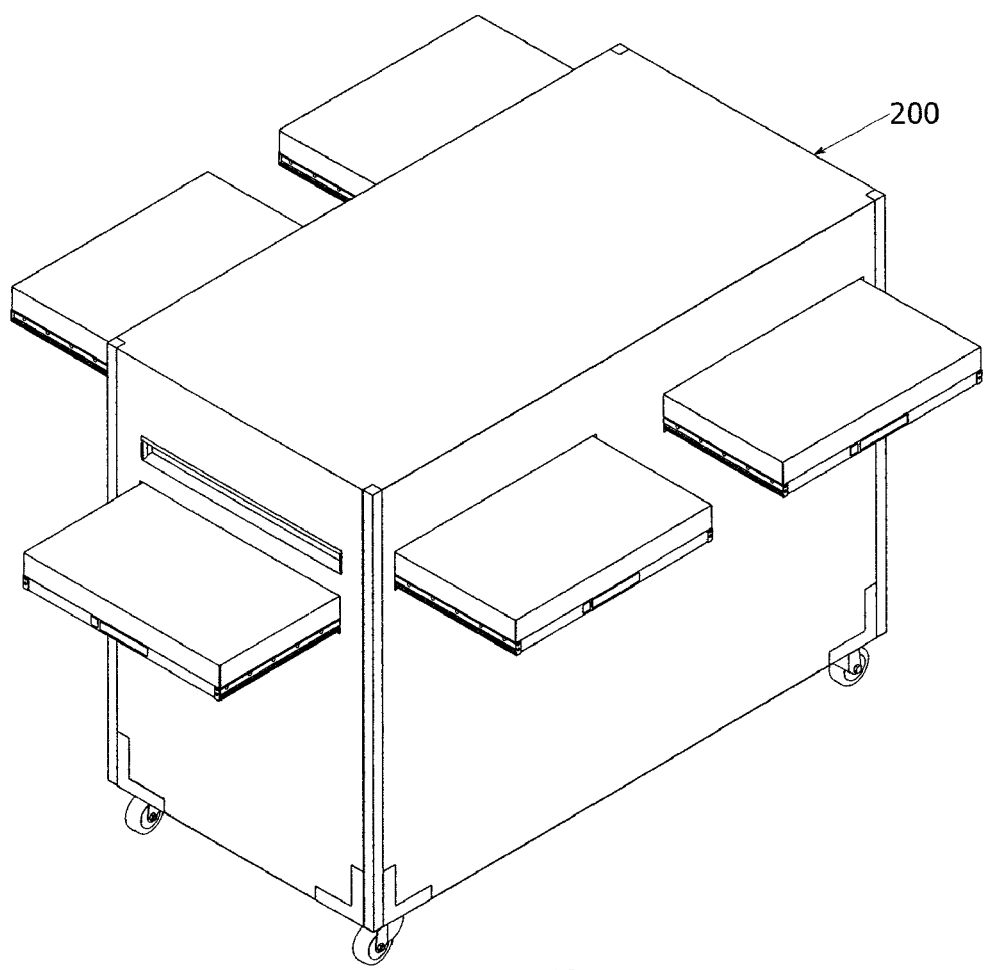
FIG. 53 is a perspective view thereof with partially deployed panel trays.
Figure 54:
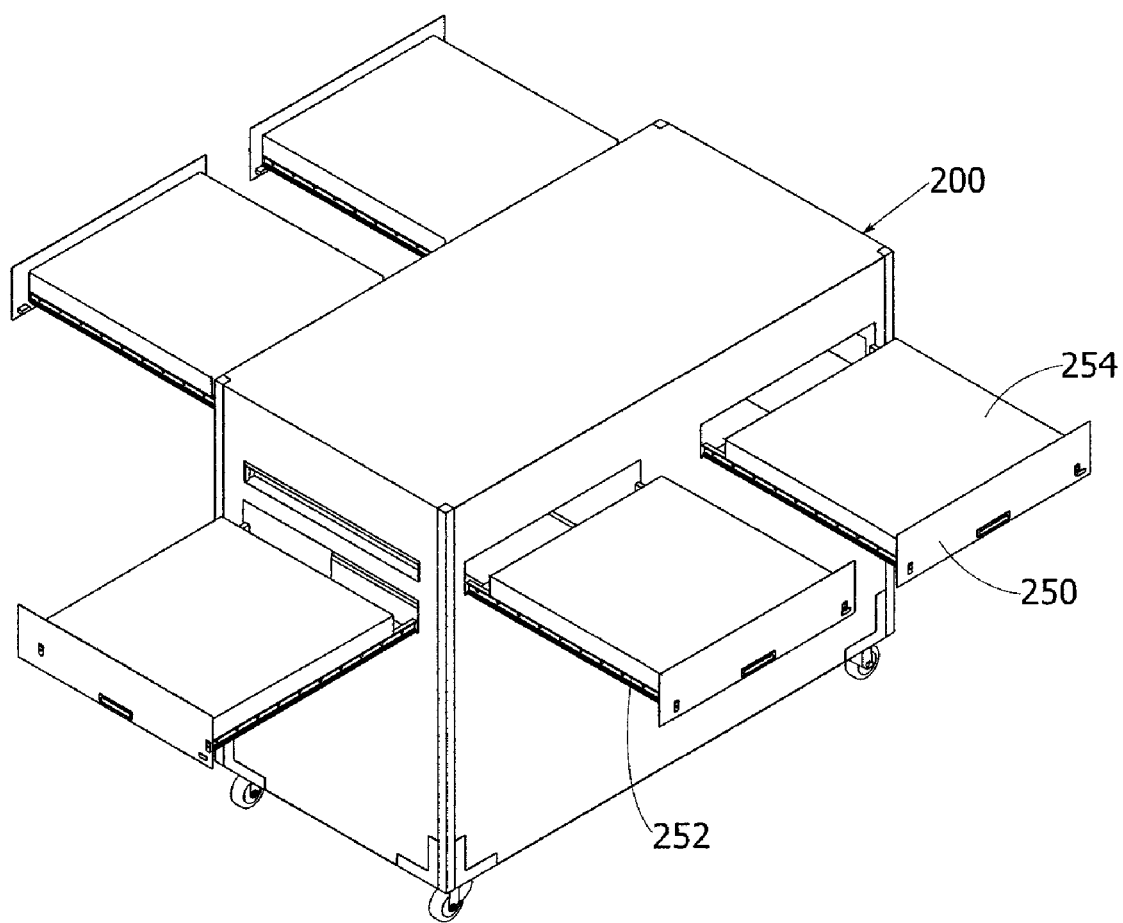
FIG. 54 is a perspective view thereof with fully deployed panel trays.
Figure 55:
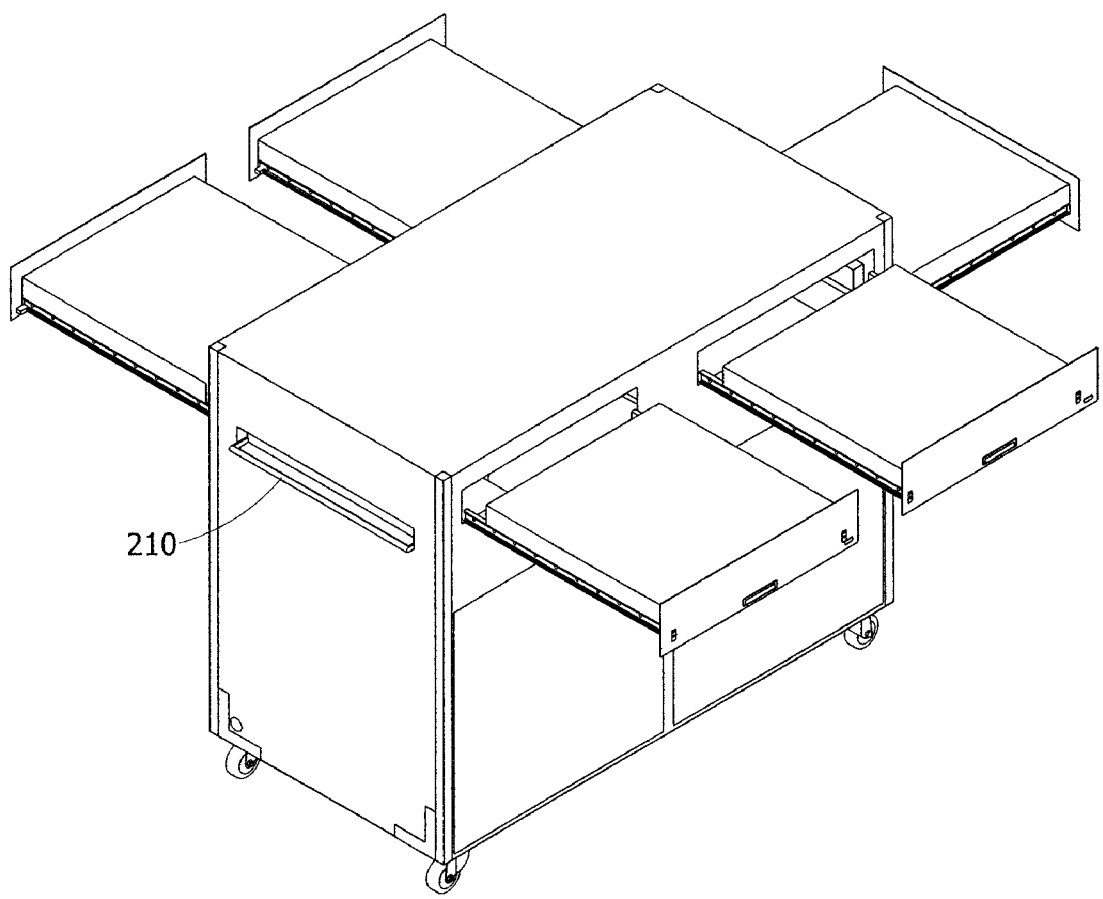
FIG. 55 is a perspective view thereof with deployed panel trays.
Figure 56:
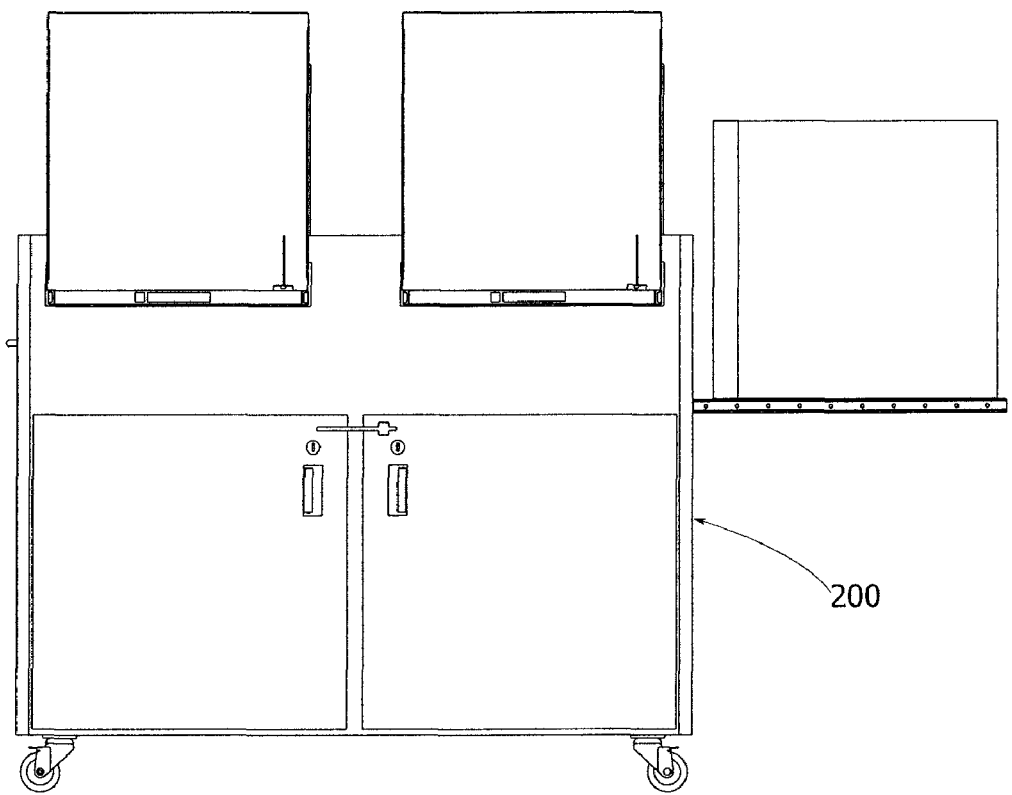
FIG. 56 is a front view thereof depicting measurements.

FIG. 50 depicts the rear view with the back (216) depicting tray (218 and 220) both of which are 32.8 inches above the floor. The wheels (223) are about 4 inches in diameter. The wheel and wheel mounting assembly raise the bottom of the voting booth (200) approximately 6 inches above the floor.

Figure 57:
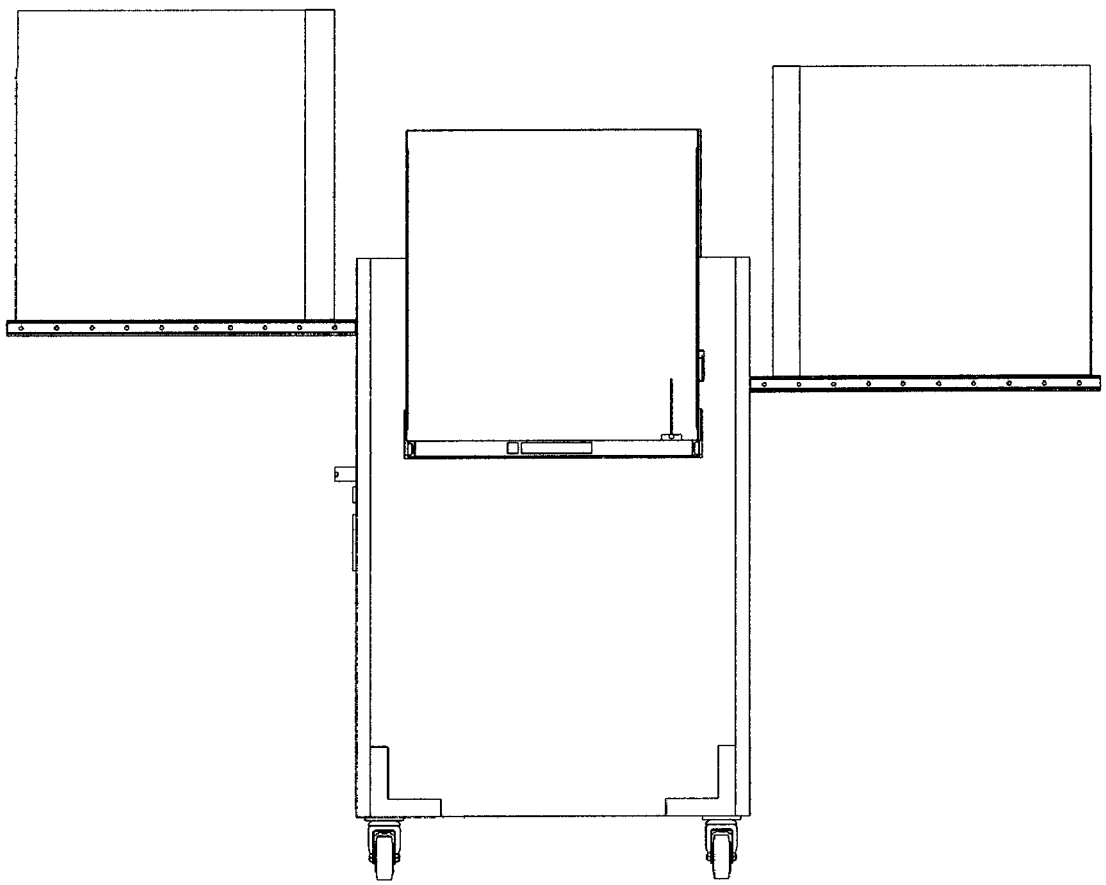
FIG. 57 is a side view thereof depicting measurements.

FIG. 57 shows an end view depicting the various elevations of the voting shelves. FIG. 58 depicts a rack assembly for securement of the display booth. FIG. 59 discloses the display booth having a left wall (240) a right wall (242) and a rear wall (244). It should be noted that the left and rear walls are joined by use of a hinge running the length of the walls. The hinge (246) is preferably a piano type hinge so as to maintain a tight closure of the unit in a closed position. Similarly, hinge (248) is used for joining rear wall (244) to right side wall (242). FIG. 60 depicts the display booth having the base (250) slideably secured to rack assembly (252).

Figure 61:
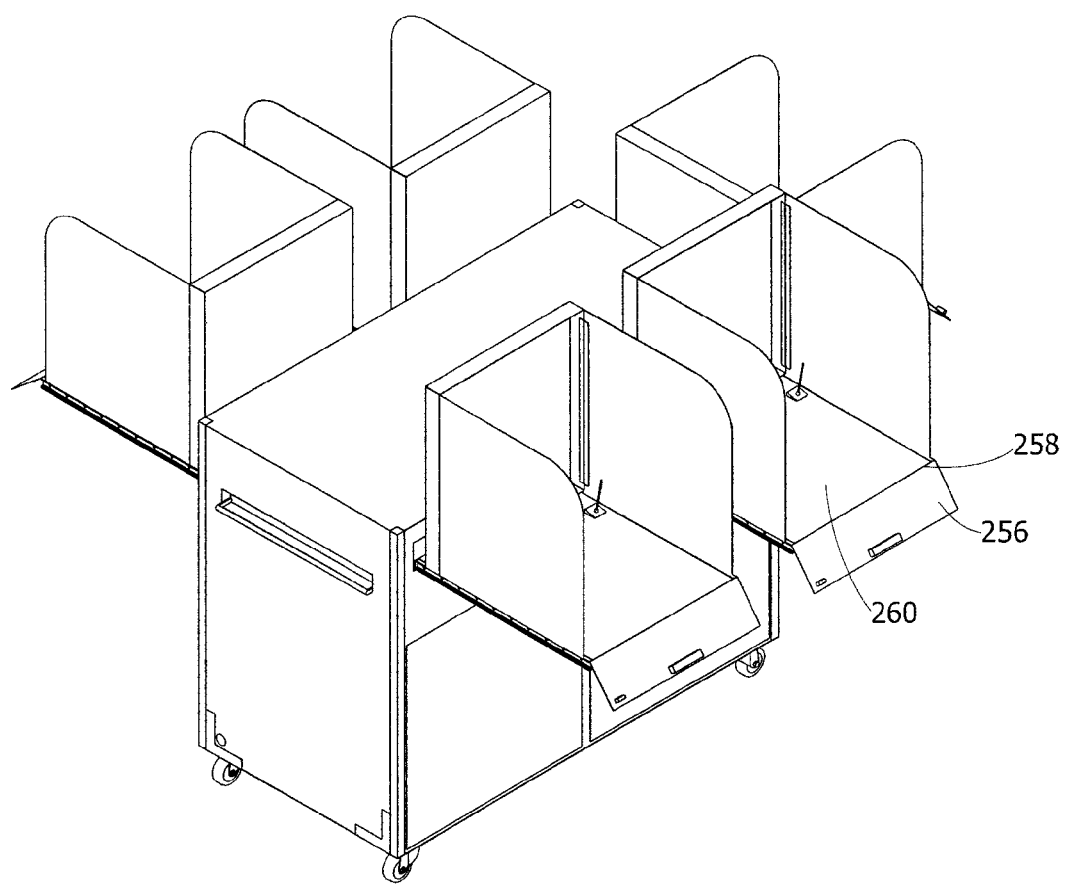
FIG. 61 is a front perspective view illustrating five voting booths deployed.
Figure 62:
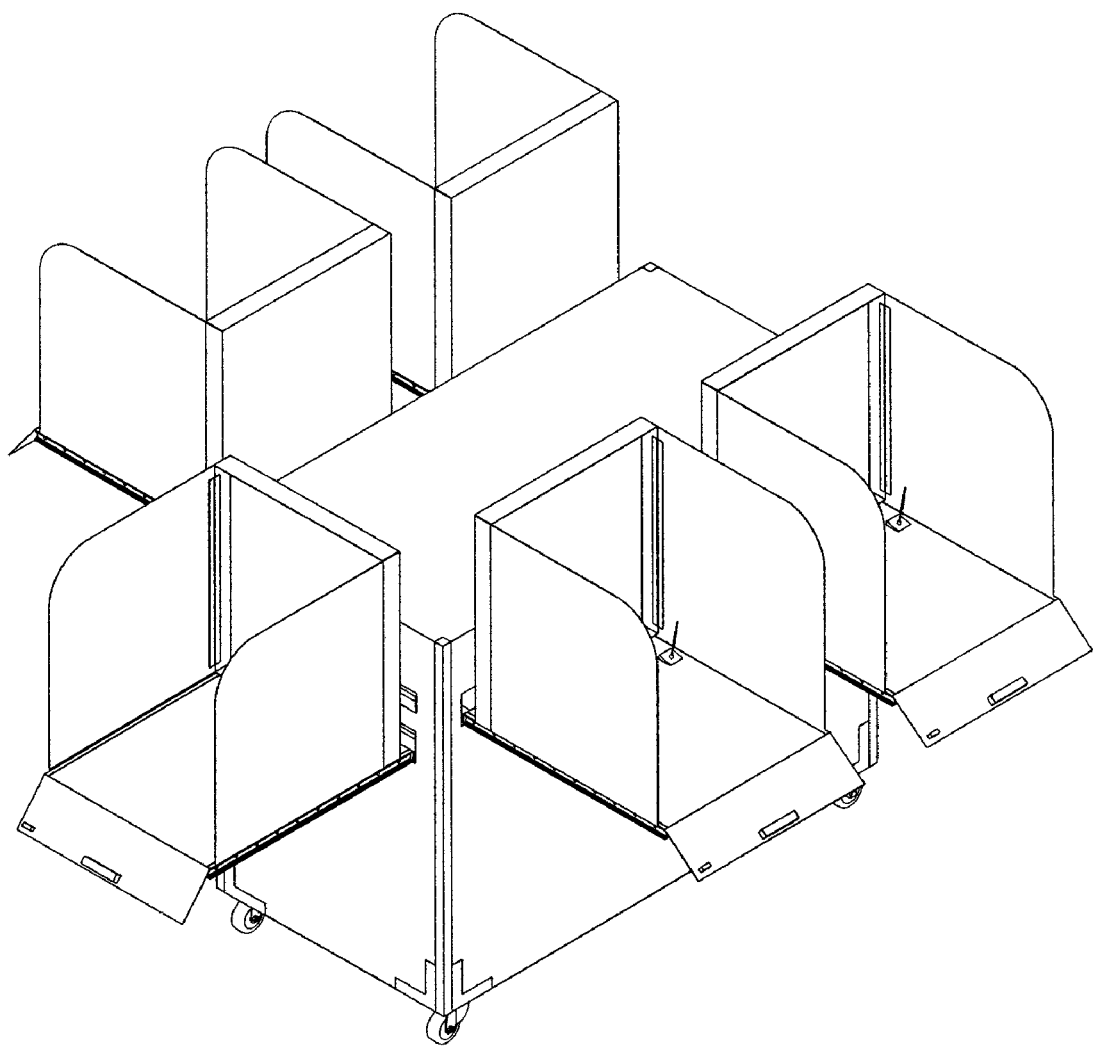
FIG. 62 is a rear perspective view thereof.

FIG. 61 sets forth a perspective view showing the five voting booths. It should be noted that each voting booth includes a front cover (256) having a hinge (258) that allows the cover to be folded downward for ease of access to the surface (260). The cover (256) further conceals the rack (252) so as to provide a more aesthetically pleasing configuration. FIG. 62 is similar to FIG. 61, although showing the right side view including the voting booth. The booths can be made out of any material, but preferable are steel based providing both stability and longevity.

While all of the distances and measurements stated herein above are the preferred distances various other distances or measurements can also be employed.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The invention claimed is:

1. A cart for transporting a plurality of voting booths comprising:
 a front side;
 a rear side;
 a left side;
 a right side;
 a top, said top extending between and secured to said front side, said rear side, said left side and said right side;

a plurality of voting booths disposed within at least one of said front, rear, left and right sides;

said plurality of voting booths being movable between a stored position within said cart and an operable position extending outwardly from at least one of said front, rear, left and right sides;

each said voting booth including a working surface and plurality of panels secured to said working surface;

said panels being pivotably secured to each other and said working surface in a manner so as to enable said panels to be both folded together and stored atop said working surface and deployed in a position normal to said working surface;

at least two of said voting booths being disposed within said cart at different heights from a support surface;

wherein one of said voting booths can be accessed by an individual from a standing position and another of said voting booths can be accessed by an individual in a seated position.

2. The cart of claim 1 wherein said voting booths are mounted on rolling trays, said rolling trays are constructed to permit said voting booths to be both completely disposed within said cart and deployed outside of said cart in an operative configuration.

3. The cart of claim 1 including a voting booth on each of said front, rear, left and right sides of said cart.

4. The cart of claim 3 wherein said voting booths on said left and right sides of said cart are disposed on said cart at a position lower than said voting booths on said front and rear sides of said cart.

5. The cart of claim 1 including a storage area within said cart, said voting booths being disposed within said cart above said storage area.

6. The cart of claim 5 including a plurality of doors on said cart, said doors providing access to said storage area; and a security device secured to said doors and said cart, said security device indicating if said doors had been opened by an unauthorized individual.

7. The cart of claim 1 wherein said panels include a rear panel, a left side panel and a right side panel; a cover secured to said rear panel, said cover including a handle to enable said voting booth to be withdrawn from a storage position within said cart to an operative position and displaced into said cart in said storage position, said cover being substantially even with said front, rear, left or right side of said cart when said voting booth is in said storage position.

8. The cart of claim 7 including an illumination device mounted on said cover, said illumination device positioned to provide light onto said working surface.

9. The cart of claim 1 including a handle positioned on at least said left or said right side of said cart, said handle movable between an inoperative position wherein said handle is receded within said left or right side and an operative position wherein said handle is displaced outwardly from said left or said right side.

10. The cart of claim 7 including a device releasably securing said left and said right panel to said working surface.

11. The cart of claim 10 wherein said device releasably securing said left and said right panel is a spring biased pinion.

12. The cart of claim 7 wherein said device releasably securing said left and said right panel is a magnet.

13. The cart of claim 1 further including a plurality of wheels on a bottom of said cart, said plurality of wheels enabling said cart to be readily transported from one location to another, said plurality of wheels including a locking device, said locking device operative to prevent said plurality of wheels from rotating and thereby prevent said cart from being moved.

14. The cart of claim 5 including a plurality of horizontally disposed and a plurality of vertically disposed partitions in said storage area, said horizontally disposed partitions functioning as shelves to hold and retain materials related to voting.

\* \* \* \* \*